(12) United States Patent
Dal Pra'

(10) Patent No.: US 9,045,193 B2
(45) Date of Patent: Jun. 2, 2015

(54) COMMAND DEVICE FOR A DERAILLEUR OF A BICYCLE

(75) Inventor: Giuseppe Dal Pra', Zane (IT)

(73) Assignee: Campagnolo S.r.l., Vicenza (IT)

( * ) Notice: Subject to any disclaimer, the term of this patent is extended or adjusted under 35 U.S.C. 154(b) by 812 days.

(21) Appl. No.: 12/029,047

(22) Filed: Feb. 11, 2008

(65) Prior Publication Data

US 2008/0196537 A1 Aug. 21, 2008

(30) Foreign Application Priority Data

Feb. 9, 2007 (IT) .................................. MI07A0239

(51) Int. Cl.
*B62M 25/04* (2006.01)
*B62K 23/06* (2006.01)

(52) U.S. Cl.
CPC ........... *B62M 25/04* (2013.01); *Y10T 74/20438* (2015.01); *B62K 23/06* (2013.01)

(58) Field of Classification Search
USPC .............. 74/473.14, 473.15, 488, 489, 501.6, 74/502.2
IPC ....................................................... B62M 25/04
See application file for complete search history.

(56) References Cited

U.S. PATENT DOCUMENTS

| | | | |
|---|---|---|---|
| 1,706,542 A | 3/1929 | Pugh et al. | |
| 2,384,728 A | 9/1945 | Crumble | |
| 2,586,604 A | 2/1952 | Bennett | |
| 2,770,980 A | 11/1956 | Millward | |
| 2,854,857 A | 10/1958 | Gleasman et al. | |
| 3,279,779 A | 10/1966 | Thomas et al. | |
| 3,760,648 A | 9/1973 | Hoffman | |
| 3,776,061 A | 12/1973 | Yoshigai | |
| 3,915,029 A | 10/1975 | Shimada | |
| 3,972,247 A * | 8/1976 | Armstrong ...................... 74/489 |
| 4,002,350 A * | 1/1977 | Timbs ........................... 280/236 |
| 4,075,871 A | 2/1978 | Burke | |
| 4,100,820 A | 7/1978 | Evett | |
| 4,319,673 A | 3/1982 | Kojima | |
| 4,454,784 A | 6/1984 | Shimano | |

(Continued)

FOREIGN PATENT DOCUMENTS

| | | |
|---|---|---|
| CH | 248133 | 4/1947 |
| CN | 1144761 | 3/1997 |

(Continued)

OTHER PUBLICATIONS

Chinese Office Action, Appl. No. CN 200610090826.7, dated Apr. 3, 2009.

(Continued)

*Primary Examiner* — Thomas Diaz
(74) *Attorney, Agent, or Firm* — Volpe and Koenig, P.C.

(57) ABSTRACT

Integrated control device for a bicycle, has a support body configured to be fixed to a handlebar of a bicycle and a single lever that is mobile with respect to the support body to command both a brake and a derailleur by movement of the lever in first and second directions of movement, opposite one another; the single lever has a rest position in which it commands neither the brake nor the derailleur and it is mobile in a first direction to command the brake; the single lever is mobile in a second direction different from the first direction by a first distance to command movement of the derailleur in its first direction and by a second distance different from the first to command movement of the derailleur in its second direction.

30 Claims, 23 Drawing Sheets

(56) References Cited

U.S. PATENT DOCUMENTS

| | | |
|---|---|---|
| 4,459,871 A | 7/1984 | Shimano |
| 4,605,240 A | 8/1986 | Ciem et al. |
| 4,740,001 A | 4/1988 | Torleumke |
| D298,309 S | 11/1988 | Coue |
| 4,840,082 A | 6/1989 | Terashima et al. |
| 4,885,951 A | 12/1989 | Desenclos et al. |
| 4,930,368 A | 6/1990 | Nagano |
| 4,945,785 A | 8/1990 | Romano |
| 4,966,046 A | 10/1990 | Tagawa |
| 5,012,692 A | 5/1991 | Nagano |
| 5,020,387 A | 6/1991 | Nagano |
| 5,050,444 A | 9/1991 | Nishimura |
| 5,094,120 A | 3/1992 | Tagawa |
| RE34,007 E | 7/1992 | Desenclos et al. |
| 5,159,851 A | 11/1992 | Rahmes |
| 5,186,071 A | 2/1993 | Iwasaki |
| 5,203,213 A | 4/1993 | Nagano |
| 5,213,005 A | 5/1993 | Nagano |
| 5,222,412 A | 6/1993 | Nagano |
| 5,241,878 A | 9/1993 | Nagano |
| 5,257,683 A | 11/1993 | Romano |
| 5,279,179 A | 1/1994 | Yoshigai |
| 5,287,765 A | 2/1994 | Scura |
| 5,303,608 A | 4/1994 | Iwasaki |
| 5,400,675 A | 3/1995 | Nagano |
| 5,479,776 A | 1/1996 | Romano |
| 5,480,356 A | 1/1996 | Campagnolo |
| 5,515,743 A | 5/1996 | Lumpkin |
| 5,528,954 A | 6/1996 | Yoshigai |
| 5,601,001 A | 2/1997 | Kawakami et al. |
| 5,676,020 A | 10/1997 | Jordan et al. |
| 5,676,021 A | 10/1997 | Campagnolo |
| 5,676,022 A | 10/1997 | Ose |
| 5,755,139 A | 5/1998 | Kojima |
| 5,787,757 A | 8/1998 | Ozaki |
| 5,791,195 A | 8/1998 | Campagnolo |
| 5,806,372 A | 9/1998 | Campagnolo |
| 5,832,782 A | 11/1998 | Kawakami |
| 5,896,779 A | 4/1999 | Biersteker et al. |
| 5,900,705 A | 5/1999 | Kimura |
| 5,921,140 A | 7/1999 | Lemmens et al. |
| 5,970,816 A | 10/1999 | Savard |
| 6,073,730 A | 6/2000 | Abe |
| 6,095,010 A | 8/2000 | Arbeiter |
| 6,098,488 A | 8/2000 | Vos |
| 6,370,981 B2 | 4/2002 | Watarai |
| 6,457,377 B1 | 10/2002 | Hsu |
| 6,502,477 B1 | 1/2003 | Assel |
| 6,553,861 B2 | 4/2003 | Ose |
| 6,564,670 B2 | 5/2003 | Feng et al. |
| 6,564,671 B2 | 5/2003 | Ose |
| 6,647,823 B2 | 11/2003 | Tsumiyama et al. |
| 6,792,826 B2 | 9/2004 | Dal Pra' |
| 7,100,471 B2 | 9/2006 | Irie et al. |
| 2002/0078789 A1 | 6/2002 | Chen |
| 2002/0104401 A1 | 8/2002 | Dal Pra' |
| 2002/0124679 A1 | 9/2002 | Dal Pra' |
| 2002/0139637 A1* | 10/2002 | Tsumiyama et al. ......... 192/217 |
| 2003/0094064 A1 | 5/2003 | Dal Pra' |
| 2003/0167871 A1 | 9/2003 | Irie et al. |
| 2003/0177855 A1 | 9/2003 | Tsumiyama et al. |
| 2004/0144193 A1* | 7/2004 | Sato et al. .................. 74/502.2 |
| 2004/0237697 A1 | 12/2004 | Kawakami |
| 2004/0237698 A1 | 12/2004 | Hilsky et al. |
| 2005/0241428 A1 | 11/2005 | Tsai |
| 2006/0070480 A1 | 4/2006 | Fujii |
| 2006/0207375 A1* | 9/2006 | Jordan et al. ............... 74/489 |
| 2006/0272443 A1 | 12/2006 | Tsumiyama |
| 2007/0034037 A1 | 2/2007 | Dal Pra' et al. |
| 2007/0068332 A1 | 3/2007 | Fujii et al. |
| 2007/0137388 A1 | 6/2007 | Dal Pra' |
| 2007/0137391 A1 | 6/2007 | Fujii |
| 2007/0178715 A1 | 8/2007 | Fujii |
| 2007/0186715 A1 | 8/2007 | Dal Pra' |
| 2007/0193386 A1 | 8/2007 | Fujii |
| 2007/0204716 A1 | 9/2007 | Dal Pra' |
| 2008/0098848 A1 | 5/2008 | Dal Pra' et al. |
| 2008/0196537 A1 | 8/2008 | Dal Pra' |
| 2008/0210041 A1 | 9/2008 | Dal Pra' et al. |
| 2008/0210042 A1 | 9/2008 | Dal Pra' |
| 2009/0025504 A1 | 1/2009 | Dal Pra' et al. |
| 2009/0031846 A1 | 2/2009 | Dal Pra' et al. |
| 2009/0133526 A1 | 5/2009 | Dal Pra' et al. |

FOREIGN PATENT DOCUMENTS

| | | |
|---|---|---|
| CN | 2436412 | 6/2001 |
| CN | 1443679 | 9/2003 |
| CN | 1550405 | 12/2004 |
| DE | 3136922 | 3/1983 |
| DE | 3706545 | 9/1988 |
| DE | 19607640 | 1/1997 |
| DE | 202006006796 | 8/2006 |
| EP | 0371254 | 6/1990 |
| EP | 0371254 A2 | 6/1990 |
| EP | 0478901 | 4/1992 |
| EP | 0504118 | 9/1992 |
| EP | 0504118 A1 | 9/1992 |
| EP | 0361335 | 2/1994 |
| EP | 0601211 | 6/1994 |
| EP | 0601221 | 6/1994 |
| EP | 0635422 | 1/1995 |
| EP | 0714826 | 6/1996 |
| EP | 0744334 | 11/1996 |
| EP | 0790175 | 8/1997 |
| EP | 1123861 | 8/2001 |
| EP | 1134158 | 9/2001 |
| EP | 1245483 | 10/2002 |
| EP | 1245483 A | 10/2002 |
| EP | 1245483 A2 | 10/2002 |
| EP | 0785128 | 11/2002 |
| EP | 1264765 | 12/2002 |
| EP | 1342655 | 9/2003 |
| EP | 1440878 | 7/2004 |
| EP | 1449756 | 8/2004 |
| EP | 1449756 A | 8/2004 |
| EP | 1449756 A1 | 8/2004 |
| EP | 1473220 | 11/2004 |
| EP | 1481883 | 12/2004 |
| EP | 1502847 | 2/2005 |
| EP | 1535829 | 6/2005 |
| EP | 1564131 | 8/2005 |
| EP | 1642823 | 4/2006 |
| EP | 1698550 | 9/2006 |
| EP | 1698550 A | 9/2006 |
| EP | 1698550 A1 | 9/2006 |
| EP | 1739001 | 1/2007 |
| EP | 1739001 A | 1/2007 |
| EP | 1739001 A1 | 1/2007 |
| EP | 1816066 | 8/2007 |
| EP | 1826111 | 8/2007 |
| FR | 960276 | 4/1950 |
| FR | 2777528 | 10/1999 |
| FR | 2861686 | 2/2006 |
| GB | 615173 | 1/1949 |
| GB | 2012893 | 8/1979 |
| JP | 58003987 | 6/1956 |
| JP | 51060342 | 5/1976 |
| JP | 17893 | 1/1982 |
| JP | 17894 | 1/1982 |
| JP | 58030884 A | 2/1983 |
| JP | 224879 | 12/1983 |
| JP | 60107475 | 6/1985 |
| JP | 157092 | 10/1989 |
| JP | 2088384 | 3/1990 |
| JP | 03292280 | 12/1991 |
| JP | 04331689 | 11/1992 |
| JP | 05097088 A | 4/1993 |
| JP | 05082786 | 11/1993 |
| JP | 05286476 | 11/1993 |
| JP | 06016170 | 1/1994 |
| JP | 07033063 A | 2/1995 |
| JP | 07251784 | 10/1995 |
| JP | 08328679 A | 12/1996 |

(56) References Cited

FOREIGN PATENT DOCUMENTS

| JP | 61241287 | 10/2007 |
|---|---|---|
| TW | 136125 Y | 6/1990 |
| TW | 510875 | 11/2002 |
| TW | 519089 | 1/2003 |
| TW | 570013 Y | 1/2004 |
| TW | 1223636 | 11/2004 |
| WO | 9218374 | 10/1992 |
| WO | 03093094 | 11/2003 |
| WO | 2005044656 | 5/2005 |

OTHER PUBLICATIONS

Chinese Office Action, Appl. No. CN 200710005823.3, dated Sep. 25, 2009.
Chinese Office Action, Appl. No. CN 200810082341.2, dated Nov. 30, 2010.
European Search Report, Appl. No. EP 05425458.6, dated Nov. 16, 2005.
European Search Report, Appl. No. EP 05017003.4, dated Dec. 20, 2005.
European Search Report, Appl. No. 06003694.4, dated Jul. 31, 2006.
European Search Report, Appl. No. RS 144832, dated Apr. 16, 2007.
European Search Report, Appl. No. RS 115409, dated Jul. 18, 2007.
European Search Report, Appl. No. RS 115410, dated Jul. 31, 2007.
European Search Report, Appl. No. RS115682, dated Oct. 30, 2007.
European Search Report, Appl. No. 08003760.9, dated Jun. 27, 2008.
European Search Report, Appl. No. EP 08003755.9, dated Jun. 27, 2008.
European Search Report, Appl. No. EP 08022485.0, dated Jul. 2, 2009.
European Search Report, Appl. No. 08005438.0, dated Nov. 5, 2010.
Japanese Office Action, Appl. No. JP 2002-332045, dated Dec. 16, 2008.
Japanese Office Action, Appl. No. JP 2008-550914, dated May 24, 2011.
Japanese Office Action, Appl. No. 2006-176333, dated Aug. 23, 2011.
Taiwan Search Report, Appl. No. 096101651, dated Oct. 5, 2011.
Taiwan Office Action and Search Report, Appl. No. 095121477, dated Nov. 25, 2011.
European Search Report for Appl. No. 08002171.0-1254/1955937, dated Aug. 28, 2012.

\* cited by examiner

COMMAND DEVICE FOR A DERAILLEUR OF A BICYCLE

FIELD OF INVENTION

The present invention relates to a control device for actuating a derailleur and a brake of a bicycle.

BACKGROUND

The following description is made with reference to devices particularly configured for bicycles with curved handlebars (typical of racing bicycles); however, the control device described could also be applied to straight handlebars (typical of mountain bikes).

A bicycle is normally provided with two derailleurs, a front one associated with the crankset and a rear one associated with the sprocket assembly. In both cases, the derailleur engages the transmission chain moving it over gear wheels of different diameters and numbers of teeth, so as to obtain different transmission ratios; the derailleur, be it the rear one or the front one, is moved in one direction by a tension exerted by an inextensible cable that is normally sheathed (commonly known as Bowden cable), and in the opposite direction by the elastic return action of an elastic return member (typically a spring), provided in the derailleur itself. Normally, the derailleur is moved by the elastic return member when the chain passes from a gear wheel of larger diameter to a gear wheel of smaller diameter, i.e. so-called downward gearshifting; vice-versa, the tension of the control cable takes place during so-called upward gearshifting, in which the chain moves from a gear wheel of smaller diameter to a gear wheel of larger diameter. It should be noted that in a front derailleur downward gearshifting corresponds to the passage to a lower transmission ratio, whereas in a rear derailleur it corresponds to a higher transmission ratio.

The movement in the two directions of the control cable of a derailleur is obtained through a control device mounted so as to be easy to maneuver for the cyclist, i.e. normally on the handlebars, close to the hand grips where the brake lever for commanding the brake actuation cable of the front or rear wheel is also located. Control devices that allow the control of both a derailleur in two directions and of a brake are commonly known as integrated controls. By convention, the control device of the front derailleur and the brake lever of the front wheel are located in the vicinity of the left hand grip, and vice-versa, the control device of the rear derailleur and the brake lever of the rear wheel are located in the vicinity of the right hand grip.

In most integrated control devices, the control cable is actuated in tension or in release through winding and unwinding on a rotor element, commonly known as cable-winding bush, the rotation of which is controlled by the cyclist with suitable control levers.

SUMMARY

An integrated control device for a bicycle comprises a support body suitable for being fixed to a handlebar of a bicycle and a single lever that is mobile with respect to the support body to command both a brake and a derailleur in each of a first and second direction of movement, opposite one another. The single lever has a rest position in which it commands neither the brake nor the derailleur, and is mobile in a first direction to command the brake, and in a second direction different from the first direction to command the derailleur. The derailleur is commanded by movement of the lever by a first distance to actutate movement of the derailleur in its first direction and by a second distance different from the first to actuate movement of the derailleur in its second direction.

BRIEF DESCRIPTION OF THE DRAWINGS

Further characteristics and advantages shall become clearer from the following detailed description of some preferred embodiments thereof, made with reference to the attached drawings.

DETAILED DESCRIPTION OF THE PREFERRED EMBODIMENTS

Figure 1:
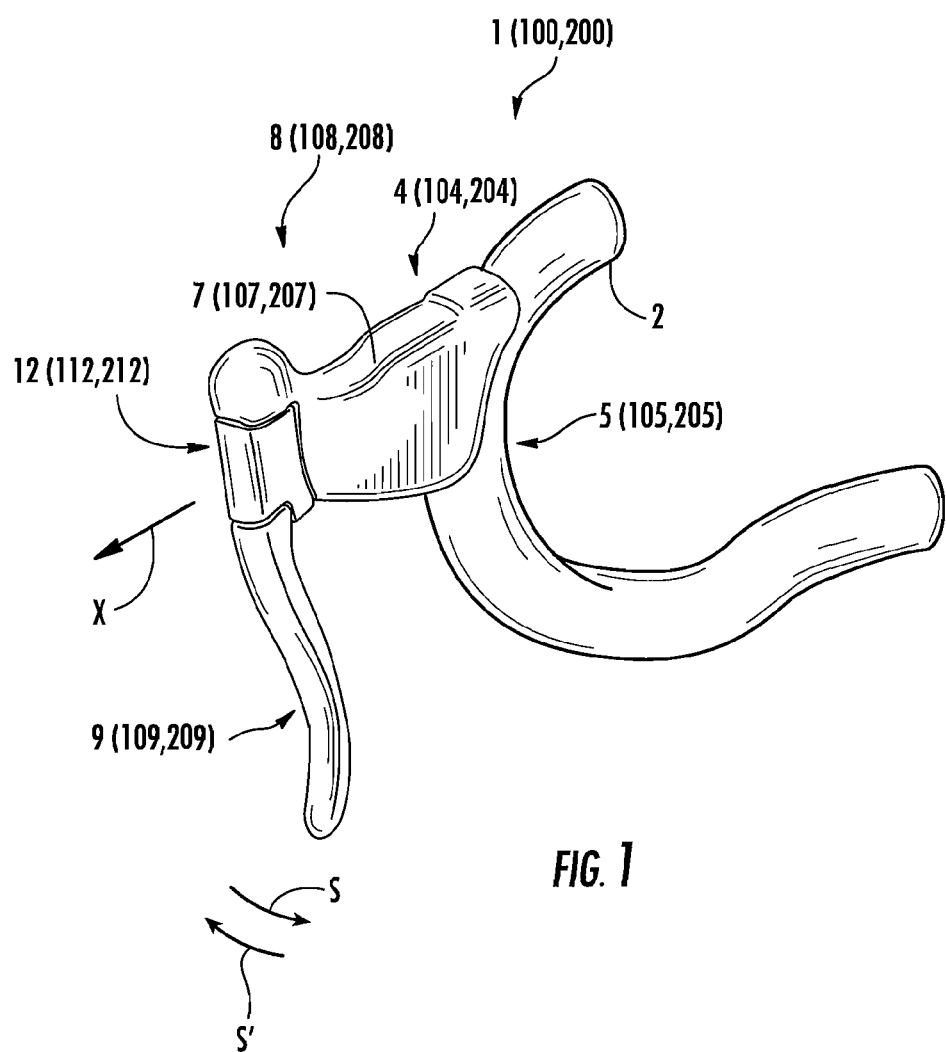
FIG. 1 is an axonometric view of a right control device according to the first embodiment of the device, mounted on the handlebars of a bicycle; this figure is also representative of a right control device according to the second and third embodiments of the device, and the reference numerals between brackets refer to such a device.

By using the device described herein, the cyclist never needs to move the grip of his hands, regardless of the maneuver he has to perform: braking, upward gearshifting or downward gearshifting. Therefore, he can perform any maneuver quickly and safely. If necessary, the cyclist can also carry out braking and gearshifting simultaneously, without having to wait to complete one operation before beginning the other; to do so, he must simply move the single lever both in the first and in the second directions.

The second direction can be substantially perpendicular to the first direction as shown; the operative movements are thus clearly distinct from each other, without a braking maneuver potentially unexpectedly causing a gearshifting maneuver and/or vice-versa.

The movement of the derailleur in the first direction corresponds to downward gearshifting and the movement of the derailleur in the opposite direction corresponds to upward gearshifting, and therefore a first movement of the single lever causes downward gearshifting, whereas a second further movement causes upward gearshifting. This way of operating is more instinctive for the cyclist. Alternatively, however, the opposite is also possible.

The support body is gripped by a hand by the cyclist.

The device comprises an intermediate body, which is supported so that the lever can move in rotation with respect to the support body about a first rotational axis, and the single lever moves in rotation with respect to the intermediate body about a second rotational axis, different from the first.

The provision of this intermediate body allows the possibility of movement in the two directions in a simple and safe manner, without compromising the strength of the device.

When the single lever is in the rest position, the second rotational axis substantially points in the direction of movement of the bicycle and the first rotational axis substantially points in a transversal direction with respect to the direction of movement of the bicycle. In this way, in the case of a racing bicycle, with curved handlebars, the first rotational axis is substantially horizontal; on the other hand, in the case of a mountain bike, with straight handlebars, the first rotational axis is substantially vertical.

The intermediate body comprises a seat for receiving a widened head of a brake control cable, in a distanced position with respect to the first rotational axis, so that a rotation of the intermediate body about the first rotational axis determines a tension on the brake control cable and therefore braking.

The device comprises a connecting rod mounted so that it can move in rotation with respect to the intermediate body about the second rotational axis; the mobile single lever is hinged to the connecting rod according to a third rotational axis, different from the second rotational axis and parallel thereto; the single lever is angularly mobile with respect to the connecting rod about the third rotational axis between a rest position and a deviated position; the connecting rod is angularly mobile with respect to the intermediate body about the second rotational axis between a rest position and at least one deviated position.

The mounting of the single lever on the connecting rod so that it can move in rotation, and the provision of the two parallel rotational axes allow the desired actuation differentiated according to the amount of movement given to the single lever to be obtained, as shall be better illustrated hereafter.

A first elastic member is provided between the connecting rod and the intermediate body, and a second elastic member is provided between the single lever and the connecting rod, both to push the single lever into its rest position. These elastic members, typically springs, cause a return into position of the connecting rod and of the lever, once the pushing action of the cyclist has ended.

The first elastic member exerts a push on the connecting rod that prevails over the second elastic member, so that a push on the single lever first moves the single lever into the deviated position without moving the connecting rod and then subsequently moves the connecting rod. In the same way, once the push on the single lever has ended, first the connecting rod goes back into position with respect to the intermediate body, then the single lever goes back into position with respect to the connecting rod.

A device according to what has been outlined above can be used both in a mechanical gearshift, and in a servo-assisted gearshift, i.e. in which the derailleur is not moved by a control cable but by electric or hydraulic systems.

In the case of a mechanical gearshift, the device is suitable for commanding a derailleur actuated by a control cable, and comprises:
 a cable-winding bush, supported so that it can move in rotation on the support body, on which bush the derailleur control cable is wound;
 an indexing mechanism that comprises a gear wheel supported so that it can move in rotation on the intermediate body about the second rotational axis among a predetermined number of predetermined angular positions corresponding to the desired positions of the derailleur; and
 a transmission mechanism between the cable-winding bush and the gear wheel of the indexing mechanism, such that a rotation of the gear wheel corresponds to a rotation of the cable-winding bush.

The transmission mechanism allows the gear wheel of the indexing mechanism to be on the intermediate body while the cable-winding bush is on the support body, making both the operation of the indexing mechanism and that of the cable-winding bush simple and therefore reliable.

The transmission mechanism comprises a sliding connection suitable for allowing the movement of the indexing mechanism with respect to the cable-winding bush; further, the transmission mechanism allows a rotation of said intermediate body about said first axis.

In a configuration, the sliding connection comprises at least one slot that slidably receives a projecting element associated with the cable-winding bush and/or with the gear wheel. Such a configuration is very simple and allows large relative displacements between the intermediate body and the support body.

The transmission mechanism comprises an intermediate shaft and first and second Hooke's joints. The first Hooke's joint connects the intermediate shaft to the gear wheel of the indexing mechanism and the second Hooke's joint connects the intermediate shaft to the cable-winding bush. The configuration with double Hooke's joint ensures that there is a correspondency between the rotation of the gear wheel and the rotation of the cable-winding bush.

In an embodiment of the indexing mechanism:
 the gear wheel comprises a first and a second sector, in each of which respective first and second sets of teeth are formed that define a number of spaces therebetween at least equal to the predetermined number of angular positions of the gear wheel;
 the single lever comprises a driven arm facing towards the first sector, provided with a first ratchet of a shape compatible with the shape of a space of the first sector;
 the device further comprises:
 a rocker arm, hinged to the intermediate body according to a fourth rotational axis parallel to the second and third rotational axes and provided with a first arm facing towards the driven arm of the single lever and a second arm facing towards the second sector and equipped with a second ratchet of a shape compatible with the shape of a space of the second sector; and
 a third elastic member between the intermediate body and the rocker arm to push the rocker arm with its second arm towards the second sector; wherein
 the driven arm of the single lever pushes on the first arm of the rocker arm against the push of the third elastic member, when the single lever is moved from its rest position towards its deviated position.

This configuration allows the desired functionality to be achieved in a relatively simple and therefore reliable manner.

The spaces of the first and second sector are each defined by an active side and an inactive side, the active side facing, with respect to the space, in a first direction of rotation of the gear wheel corresponding to the direction of rotation of the cable-winding bush during winding of the derailleur control cable.

When the lever and the connecting rod are in their rest positions, the first ratchet is not engaged with any space of the first sector, whereas the second ratchet is engaged in one of the spaces of the second sector and abuts the active side of the space, so as to prevent a rotation of the gear wheel in a second direction of rotation opposite the first direction of rotation.

When the lever is taken from its rest position into its deviated position without the connecting rod being moved from its rest position, the first ratchet is taken into partial engagement in one of the spaces of the first sector, distanced from the active side. At the same time, the second ratchet is taken out of engagement with the space of the second sector, so that the gear wheel can rotate in the second direction of rotation by a small amount due to the tension of the derailleur control cable, sufficient so that the first ratchet moves against the active side of the space in which it is engaged while the second ratchet goes from the position opposite the space in which it was engaged to a position opposite the adjacent space.

When the lever is taken back from its deviated position to its rest position, without the connecting rod being moved from its rest position, the second ratchet goes into engagement with the space that it was opposite to, while the first ratchet is taken out of engagement with the space in which it was engaged.

When the connecting rod is taken from its rest position to its deviated position, with the lever remaining in its deviated position with respect to the connecting rod, the first ratchet remains engaged in the seat and pushes the active side of the space, making the gear wheel rotate in the first direction, whereas the second ratchet is pressed by the third elastic member against the gear wheel and slides on the inactive side of the spaces without opposing the rotation of the gear wheel.

When the connecting rod and the lever are taken back into their rest positions, the first ratchet is taken out of engagement with the gear wheel whereas the second ratchet remains engaged in one of the spaces, preventing the rotation of the gear wheel in the second direction.

In the case of a servo-assisted gearshift, the device is suitable for commanding a derailleur actuated by a servo-assisted system, and comprises a first movement detector between the single lever and the connecting rod and a second movement detector between the connecting rod and the intermediate body.

In this way, the small and large movements of the single lever in the same direction are easily detected and distinguished with good reliability.

The first movement detector is a first contact detector actuated by a contact between the connecting rod and a driven arm of the single lever when it reaches its deviated position, and the second movement detector is a second contact detector actuated by a contact between a projection of the connecting rod and the intermediate body when the connecting rod reaches its deviated position.

The use of contact detectors allows the movements (both small and large), to be recognized with certainty once they have been completed, avoiding false actuations in the case of incomplete movements.

The first contact detector is provided in a seat on the connecting rod, and the second contact detector is provided in a seat on the intermediate body.

The servo-assisted system comprises an electric motor.

In the second embodiment of the invention, an integrated control device for a bicycle comprises a support body suitable for being fixed to the handlebars of a bicycle and a single lever that is mobile with respect to the support body. The lever commands a brake and a derailleur in two first and second directions of movement, opposite one another, through a servo-assisted system. The single lever has a rest position in which it commands neither the brake nor the derailleur and is mobile in a first direction to command the brake, and in a second direction different from the first direction to command movement of the derailleur in its first direction, and in a third direction different from the first directions to command movement of the derailleur in its second direction.

According to a third embodiment of the device, an electric control device for a bicycle, suitable for commanding a derailleur in first and second directions of movement, opposite one another through a servo-assisted system, comprises, in particular, a support body suitable for being fixed to the handlebars of a bicycle, and a lever that is mobile with respect to the support body for commanding a derailleur. The lever has a rest position in which it does not command the derailleur, and is mobile in a single direction by movement of a first distance to command movement of the derailleur in its first direction, and by movement of a second distance different from the first to command movement of the derailleur in its second direction.

In this way, the cyclist does not need to change his grip with his hands during gearhsifting, and the movement that he has to make is always in the same direction. He can therefore carry out all gearshifting quickly and safely.

The first distance is less than the second distance, i.e. a first relatively modest movement of the single lever causes downward gearshifting, whereas a second relatively large movement causes upward gearshifting; this way of operating is more instinctive for the cyclist. Alternatively, however, the opposite is also possible.

The device comprises a connecting rod mounted so that it can rotate in the support body about a rotational axis between a rest position and at least one deviated position, and in which the single lever is hinged to the connecting rod according to a rotational axis between a rest position and a deviated position, the rotational axis of the single lever being different from the rotational axis of the connecting rod and parallel thereto.

The mounting of the single lever on the connecting rod so that it can move in rotation, and the provision of the two parallel rotational axes allow the desired differentiated actuation according to the amount of movement given to the single lever to be obtained, as shall be better illustrated hereafter.

The device comprises a first elastic member between the connecting rod and the support body to push the connecting rod into its rest position and a second elastic member between the single lever and the connecting rod to push the single lever into its rest position. These elastic members, typically springs, determine the return into position of the connecting rod and of the lever, once the pushing action by the cyclist has ended.

The first elastic member exerts a push on the connecting rod that prevails over the second elastic member, so that a push on the single lever first moves the single lever into the deviated position without moving the connecting rod, and then subsequently moves the connecting rod. In the same way, once the push on the single lever has ended, first the connecting rod goes back into position with respect to the intermediate body, then the single lever goes back into position with respect to the connecting rod.

According to the fourth embodiment of the device, a method for controlling a bicycle comprising a braking system and at least one gearshift with a derailleur that is mobile in opposite first and second directions of movement, comprises:

actuation of a lever in a first direction to command the braking system to obtain braking;

actuation of the same lever in a second direction different from the first direction to command the movement of the derailleur in its first direction;

actuation of the same lever in a third direction different from the first direction to command the movement of the derailleur in its second direction.

The following description shall be made for a right hand control device 1, but it is clear that this can be applied to a left hand control device mounted on the left end of the handlebars 2 and associated with the brake and with the front derailleur; equally, the device can be applied to a right or left device mounted on straight handlebars like in a mountain bike.

FIG. 1 shows a control device 1. The control device 1 is a right control device for a racing bicycle, and it is therefore mounted on the curved right end of the handlebars 2 to command the braking operations of the rear brake and the gear-shifting operations of the rear derailleur.

The control device 1 comprises a support body 4 with a side 5 for connection to the handlebar 2 and a portion 7, projecting with respect to the side 5 and which can be held by the cyclist during riding.

The support body 4 is connected to the handlebar 2 in a per se known way, for example by means of a strap (not shown).

A control group 8 comprising an indexing mechanism 12 and a lever 9, cooperating mechanically with the indexing mechanism 12, is mounted on the support body 4.

Figure 2:
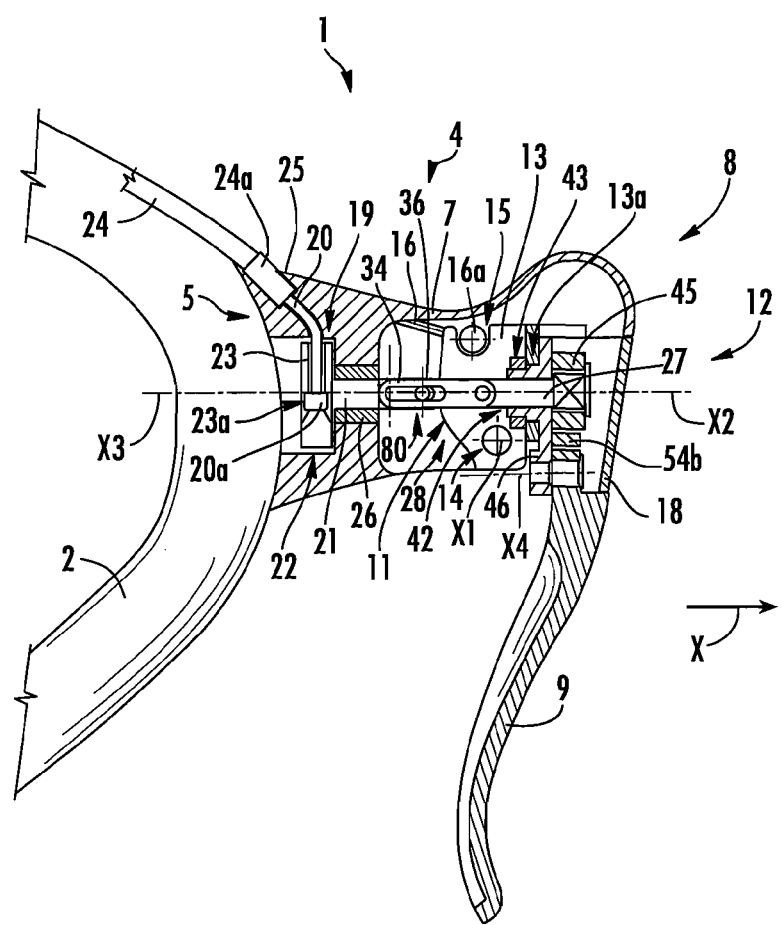
FIG. 2 is a side section view along a vertical section plane of the control device of FIG. 1 in a first non-operative position.
Figure 3:
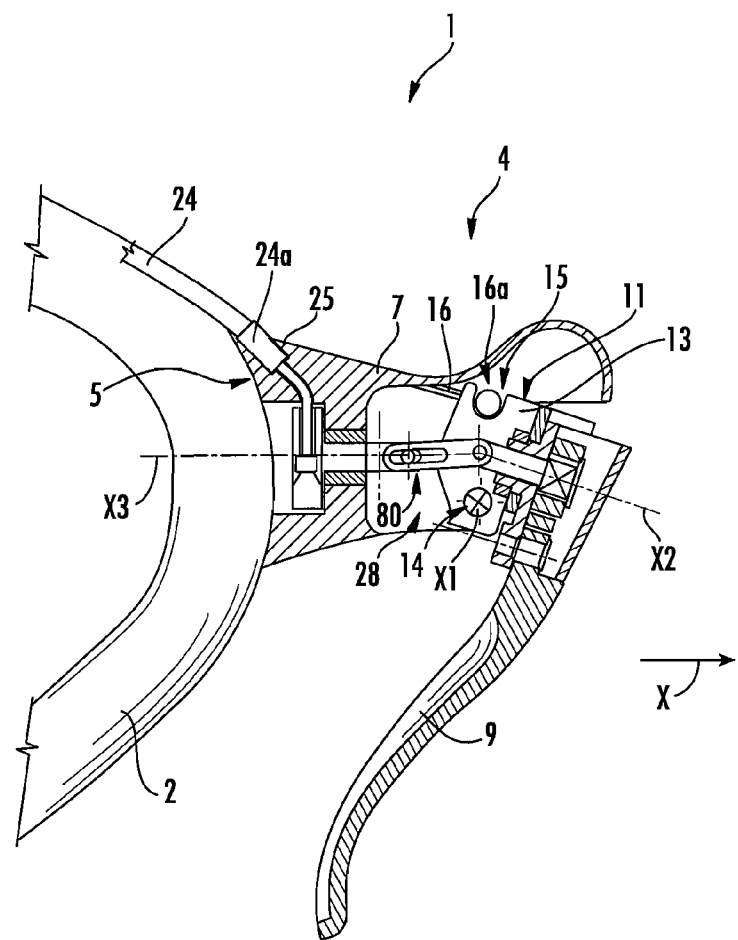
FIG. 3 is a side section view along a vertical section plane of the control device of FIG. 1 in a second operative braking position.

As shown in FIGS. 2 and 3, the support body also comprises an intermediate body 11 hinged to the support body 4 by a pivot 14 arranged along a first rotational axis X1, substantially horizontal and perpendicular to the direction of movement X of the bicycle.

The lever 9, is able to rotate about a second axis X2.

The lever 9 and the indexing mechanism 12 are mounted on the intermediate body 11. The indexing mechanism 12, as shall be described better hereafter, has a main shaft 27 that takes up predetermined angular positions according to the position of the rear derailleur selected by the cyclist. The intermediate body 11 is formed from a plate 13 hinged to the support body 4 by the aforementioned pivot 14. On the plate 13, an open cylindrical seat 15 is formed for the attachment of a widened head 16a of a brake cable 16. In a known way, the outer sheath (not illustrated but similar to sheath 24 discussed below), of the brake cable 16 is positioned with its end abutting a cylindrical recess defined in the support body 4. This cylindrical recess is not shown in the view of FIG. 2 but a similar recess 25 is shown with the control cable 20, discussed below.

In the support body 4, close to the side 5 facing towards the handlebars 2, a cable-winding bush 19 for a derailleur control cable 20 is housed. The cable-winding bush 19 is mounted so that it can move in rotation about a rotational axis X3 thereof, substantially coinciding with the direction X of movement of the bicycle.

The cable-winding bush 19 comprises a shaft 21 and a shank 22 on the outer surface of which a throat 23 for winding/unwinding the derailleur control cable 20 is made. On the throat 23 a seat 23a is formed to receive a widened head 20a of the derailleur control cable 20. The outer sheath 24 of the control cable 20 is positioned with its end 24a abutting a cylindrical recess 25 made in the support body 4 close to the side 5 facing towards the handlebars 2.

The control cable 20 is subjected to tension exerted by an elastic return member of the derailleur, in practice a spring, such a force in turn being applied to the cable-winding bush 19 that is therefore kept pushing in a direction S' (clockwise direction with reference to FIGS. 5-16).

An anti-friction bushing 26 is arranged between the shaft 21 of the cable-winding bush 19 and the support body 4.

The shaft 21 of the cable-winding bush 19 and the main shaft 27 of the indexing mechanism 12 are interconnected through a transmission mechanism, wholly indicated with 28.

Figure 4:
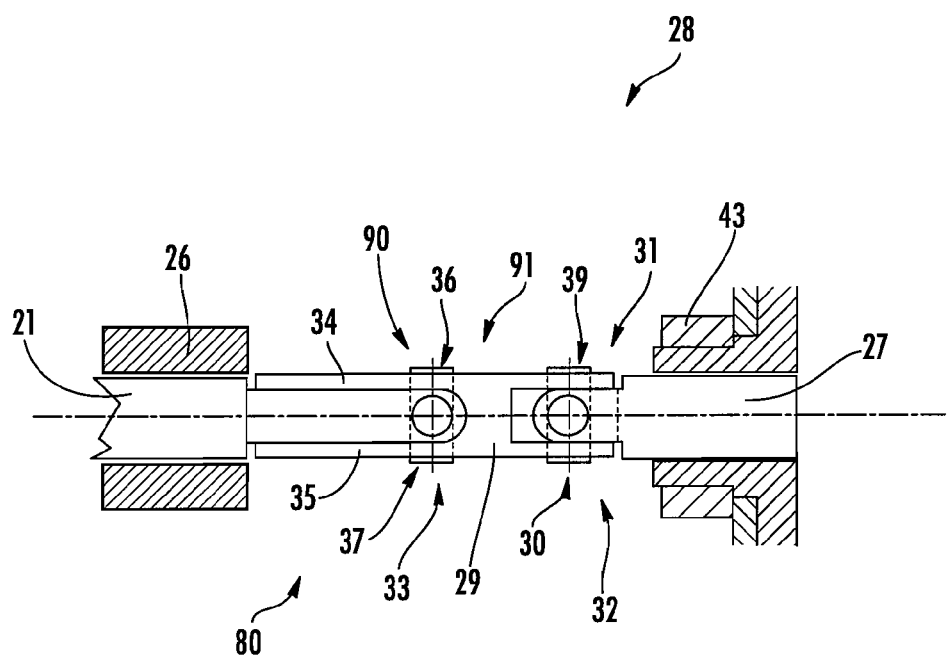
FIG. 4 is a view from below of a detail of FIG. 2.

The transmission mechanism 28, as can be seen in FIG. 4, comprises an intermediate shaft 29 connected with the first end 30 to the free end 31 of the main shaft 27 through a first Hooke's joint 32 and connected with the second end 33 to the shaft 21 of the cable-winding bush 19 through a second Hooke's joint 90.

As far as the first Hooke's joint 32 is concerned, it consists, in a per se known way, of a four point cross 39 connected by means of four links to a driving fork and to a driven fork made, respectively, at the free end 31 of the main shaft 27 and at the first end 30 of the intermediate shaft 29.

The second Hooke's joint 90 consists, in a per se known way, of a four point cross 91 connected by means of four links to the second end 33 of the intermediate shaft 29 and to the free end of the shaft 21 of the cable-winding bush 19.

Between the intermediate shaft 29 and the shaft 21 of the cable-winding bush 19 a sliding connection 80 is defined. Such a sliding connection 80 comprises two slots 34, 35, made on the portion of the intermediate shaft 29 facing towards its second end 33, which slidably receive two projecting ends 36, 37 of the four point cross 91.

The sliding connection 80 allows the axial sliding of the intermediate shaft 29 with respect to the shaft 21 of the cable-winding bush 19, as can be seen in the two different operative conditions of FIGS. 2 and 3.

The transmission mechanism 28 therefore consists of two Hooke's joints 32, 90 with an intermediate shaft 29 and a sliding connection 80 that allow both the transmission of the rotational motion between the main shaft 27 and the shaft 21 of the cable-winding bush 19, a situation that occurs during gearshifting, as well as the positioning of the same shafts in directions inclined with respect to each other, a situation that occurs during braking (FIG. 3).

In other variant embodiments, the sliding connection could be made in a different way, for example by providing two slots made on the portion of intermediate shaft 29 facing towards its first end 30 that slidably receive the projecting ends of the four point cross of the first Hooke's joint 32, or by providing, instead of the slots 34, 35, the division of one or more of the main shaft 27, the intermediate shaft 29 and the shaft 21 of the cable-winding bush 19 into two telescopic half-shafts that rotate as a unit.

As shown in FIGS. 2 and 3, when the cyclist acts to brake by pulling the lever 9 towards the handlebars 2, the intermediate body 11 rotates around the pivot 14, as can be seen in making the control group 8 rotate, and thus pulling the widened head 16a of the brake cable 16 to carry out braking.

The control group 8, described with particular reference to FIGS. 5 to 16, comprises, as stated above, the lever 9, the indexing mechanism 12 and the intermediate body 11, formed from the plate 13. A cover 18 is associated at the front with the lever 9 to cover the indexing mechanism 12.

The indexing mechanism 12, described hereafter, causes the main shaft 27 to take up a series of predetermined angular positions about the axis X2, which is substantially parallel to the direction X of movement of the bicycle. The indexing mechanism 12 causes the main shaft 27 to rotate in a first direction as a consequence of a rotation of the lever 9 by a comparatively small angle in a first direction, indicated in FIGS. 5-16 as S, and makes the main shaft 27 rotate in the opposite direction as a consequence of a rotation of the lever of the gearshift 9 by a comparatively large angle in the same direction S.

The indexing mechanism 12 comprises a gear wheel 45, which rotates as a unit with the aforementioned main shaft 27 and is rotatable with respect to the intermediate body 11 about the second rotational axis X2. In the operative condition of FIG. 2, the axis X2 is aligned with the rotational axis X3 of the shaft 21 of the cable-winding bush 19.

The gear wheel 45 is biased into rotation in the direction of unwinding U of the traction cable 20 of the derailleur, by the tension that acts upon the cable-winding bush 19.

A connecting rod 46 is mounted so that it can rotate around the main shaft 27 and is provided with a shank 42 carried by the support plate 13 in a hole 13a so that it can rotate. A locknut 43 is screwed on the outside of the shank 42 to prevent the connecting rod 46 from slipping away from the support plate 13. As an alternative to the locknut 43, it is possible to provide for the use of a Seeger ring connected on the outside to the shank 42. The connecting rod 46 is forced in the direction of unwinding U against the support plate 13 by return means, for example by a compression coil spring 47 (FIG. 5), extending between the support plate 13 and an appendix 46a of the connecting rod 46. The compression coil spring 47 could be replaced by a spiral spring having one end connected in a point of the connecting rod 46 and the other end connected to the support plate 13, in which case the connecting rod 46 could be without the appendix 46a.

The lever 9, only partially visible in FIGS. 5-16, is hinged to the connecting rod 46 by a pivot 48 extending along a rotational axis X4. Return means, for example in the form of a spiral spring 49 schematically illustrated in FIGS. 5-16, bias the lever 9 into a predetermined angular position with respect to the connecting rod 46 (substantially vertical in FIG. 5), counteracting the vibrations caused in riding the bicycle.

A first ratchet 50 is made at the end of a driven arm 9b of the lever 9 to cooperate with a plurality of first teeth 51 of a first toothed sector 45a of the gear wheel 45. More specifically, each of the first teeth 51, seen in direction U, have a side with a comparatively low inclination with respect to the tangent to the gear wheel 45, and a side with a comparatively high inclination with respect to the tangent to the gear wheel 45. The first ratchet 50 has a shape matching the shape of a space 52 between two adjacent teeth 51 and therefore has a side suitable for abutting and pushing on the side of the teeth 51 with the comparatively high inclination, called the "active side" of the teeth. The first ratchet 50 also has a side suitable for sliding on the side with comparatively low inclination of the first teeth 51, called "inactive side" of the teeth. In the rest condition of the indexing mechanism 12 shown in FIG. 5, the first ratchet 50 is in a position out of engagement with the first teeth 51.

A second ratchet 53 is located at the end of a driven arm 54a of a rocker arm 54 that is hinged to the support plate 13 through a pivot 55. The second ratchet 53 cooperates with a plurality of second teeth 56 of a second toothed sector 45b of the gear wheel 45. The second teeth 56, seen in direction U, also have a side with comparatively low inclination with respect to the tangent to the gear wheel 45 and a side with comparatively high inclination with respect to the tangent to the gear wheel 45. The second ratchet 53 has a shape matching the shape of a space 57 between two adjacent second teeth 56 and therefore has a side suitable for acting as an abutment against the side with comparatively high inclination of the second teeth 56, called the "active side" of the teeth. The second ratchet 53 also has a side suitable for sliding on the side with comparatively low inclination of the second teeth 56, called the "inactive side" of the teeth.

It should be noted that in the example illustrated and just described the ratchets 50, 53 have a shape matching the respective spaces 52, 57 between the teeth; for the purposes of the device, however, it is sufficient that the shape of the ratchets 50, 53 be compatible with that of the respective spaces 52, 57, i.e. that it can allow the pushing engagement on the active side and on the other hand can slide without becoming blocked on the inactive side.

The teeth 51, 56 for engagement with the two ratchets 50, 53 can be different from each other, but preferably they are the same in number and geometry, so that the gear wheel can be mounted indifferently in two positions angularly spaced by 180°.

Although the teeth 51, 56 are shown made along the two non-adjacent sectors 45a and 45b of the gear wheel 45, alternatively a completely toothed gear wheel could be provided.

Figure 5:
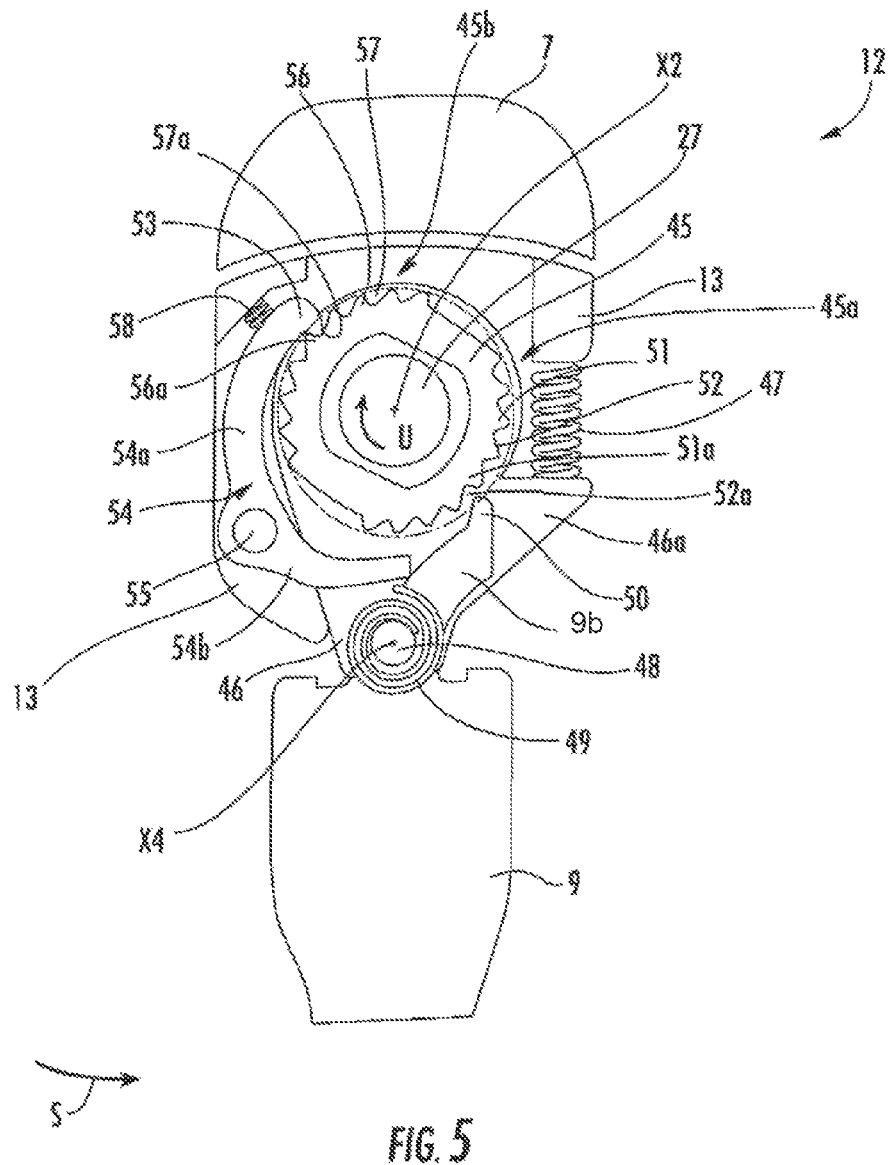
FIGS. 5 to 16 are section views that show the control mechanism of the device of FIG. 1 in various steps during gearshifting.

Return means, such as a compression spring 58 extending between the support plate 13 and the free end of the driven arm 54a of the rocker arm 54, force the rocker arm 54 into the rest position of the indexing mechanism 12 shown in FIG. 5, in which the second ratchet 53 is meshed in one of the spaces 57 and the free end of the driving arm 54b of the rocker arm 54 is in contact with the driven arm 9b of the lever 9.

In the rest condition shown in FIG. 5, the gear wheel 45 (and therefore the cable-winding bush 19), is kept in a predetermined angular position by the engagement of the second ratchet 53 in the space indicated as 57a, an engagement that counteracts the tensional force in the direction of unwinding U, due to the cable 20. The lever 9 is also in rest position when substantially vertical as illustrated.

Figure 6:
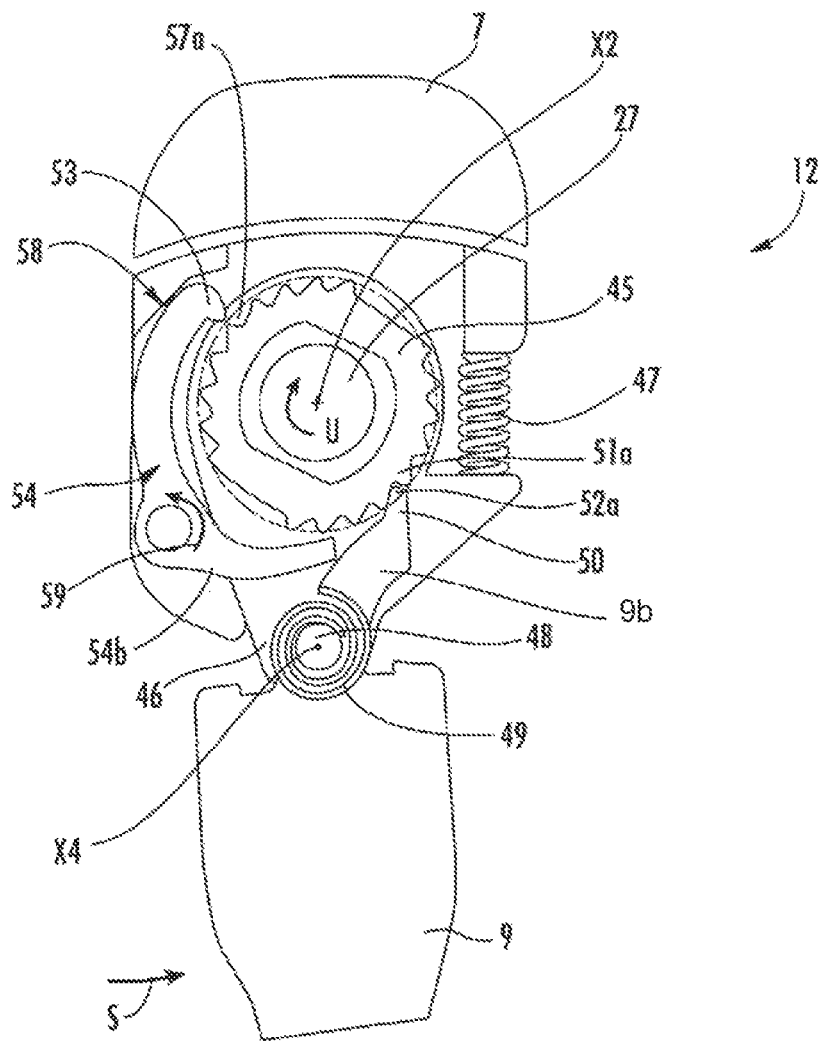

When the lever 9 is pushed softly by the cyclist in the direction indicated as S in FIG. 6, it rotates relative to the connecting rod 46 about the pivot 48. Regarding this, it must be emphasized that the spring 49 is comparatively weak and therefore yields to the push on the lever 9 by compressing, substantially without the connecting rod 46 moving.

The first ratchet 50, made on the driven arm 9b of the lever 9 and therefore in rotation about the pivot 48, faces one of the spaces, indicated as 52a, between the first teeth 51, without its side going straight into contact with the active side of the tooth indicated with 51a.

At the same time, the driving arm 54b of the rocker arm 54 is biased to slide on the driven arm 9b of the lever 9 causing the rocker arm 54 to oscillate in the direction indicated by arrow 59, against the force of the compression spring 58, i.e. compressing it, causing the second ratchet 53 to disengage from the space 57a in which it was engaged.

The gear wheel 45 and the cable-winding bush 19 are therefore free to carry out a small rotation as a unit in the direction of unwinding U of the traction cable. The condition represented in FIG. 6 is therefore a non-static condition, and the indexing mechanism 12 goes substantially immediately into the condition represented in FIG. 7, in which the active side of the tooth 51a abutted on the first ratchet 50.

As a consequence of the small rotation of the gear wheel 45 in the direction of unwinding U, the second ratchet 53 has passed over the crest of the tooth 56a and now faces the next space 57b.

Figure 8:
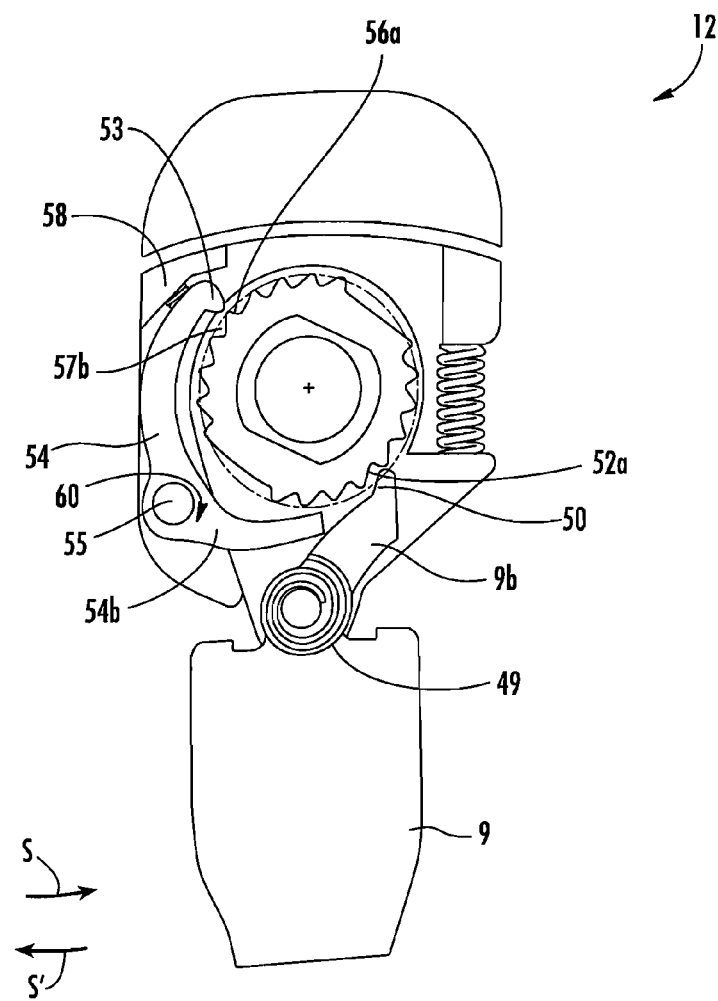

If the lever 9 is released in this operative condition, it is pulled back by the spiral spring 49 in the direction S' indicated in FIG. 8, opposite the direction S, and the first ratchet 50 slides out from the space 52a, as shown in FIG. 8. At the same time, the pushing action by the driven arm 9b of the lever 9 on the driving arm 54b of the rocker arm 54 also ceases. The rocker arm 54 is therefore biased, by the action of the spring 58, in the direction 60 of rotation about its pivot 55, opposite the aforementioned direction 59. The second ratchet 53 therefore reaches an abutting relationship on the inactive side of the tooth 56a, at the side of the space 57b. It should be noted that during this non-static step illustrated in FIG. 8, the driving arm 54b of the rocker arm 54 may or may not lose the abutting relationship on the driven arm 9b of the lever, according to the release speed of the lever 9 by the cyclist.

Figure 9:
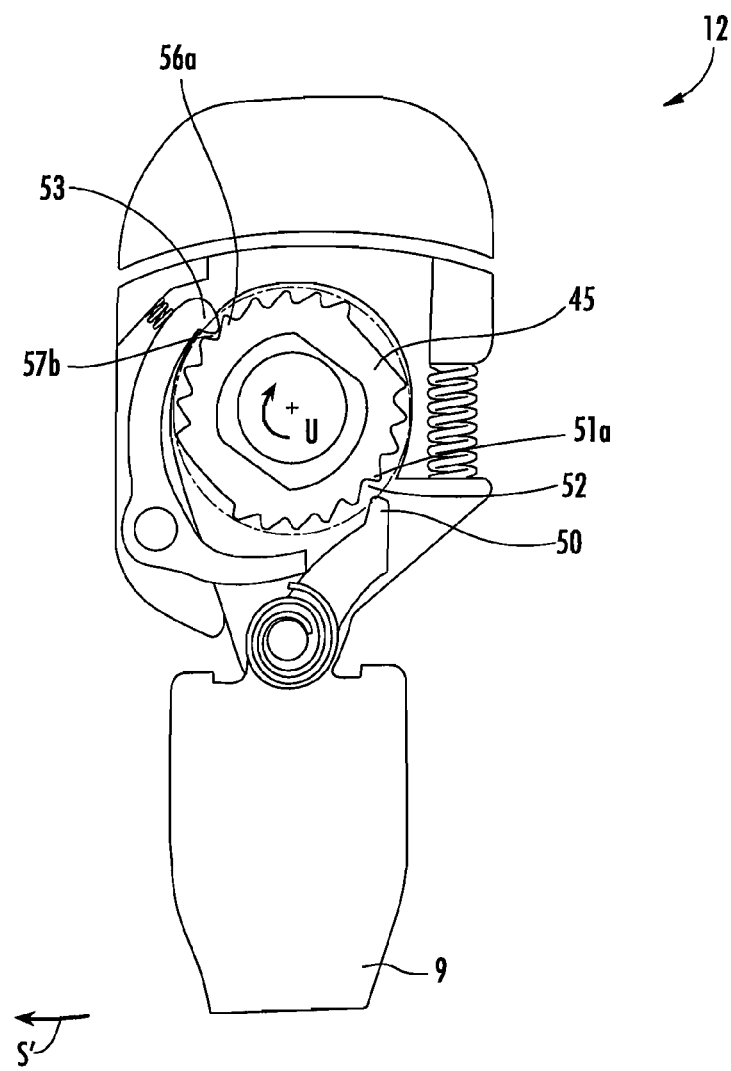

When the lever 9 goes back into the rest position, the first ratchet 50 is taken into position out of engagement by the first teeth 51 and frees the rotation of the gear wheel 45 and of the cable-winding bush 19 firmly connected thereto in the direction of unwinding U, as illustrated in FIG. 9, which also represents a non-static condition. During such a rotation, the second ratchet 53 slides along the inactive side of the tooth 56a, engaging in the space 57b.

Figure 10:
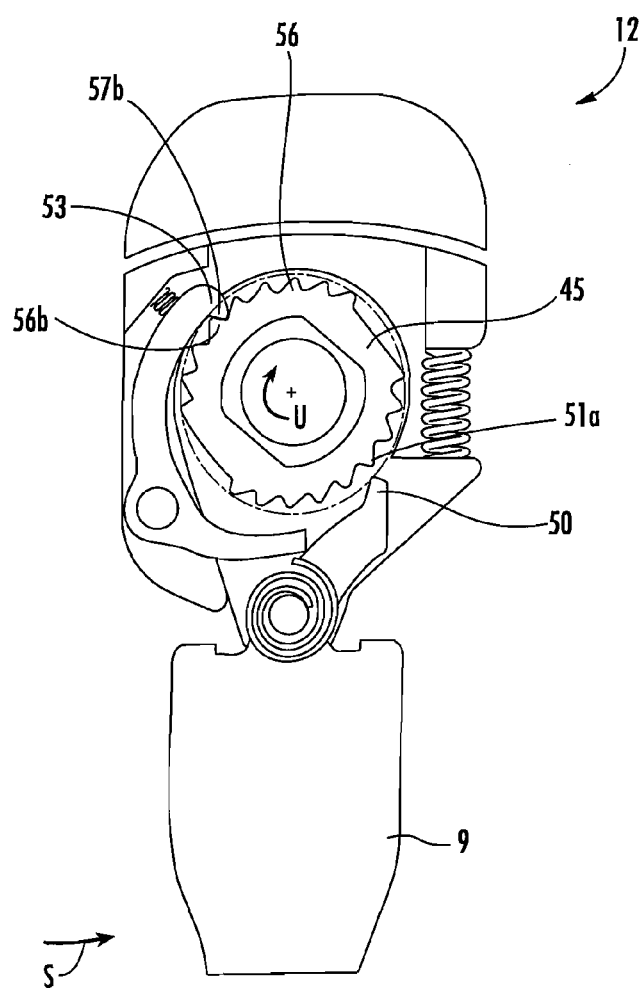

As shown in FIG. 10, the rotation in the direction of unwinding U ends when the second ratchet 53 goes into an abutting relationship on the active side of the next tooth 56b. In this condition, the gear wheel 45 and the cable-winding bush 19 are kept stationary by the engagement of the second ratchet 53 in the space 57b.

Therefore, as a consequence of the described push with an angular excursion of comparatively low extent on the lever 9, the gear wheel 45 (and therefore the cable-winding bush 19), carry out an angular rotation in the direction of unwinding U of the brake cable, of an angular extent corresponding to the pitch between the second teeth 56. Such a rotation corresponds to the release of a length of the traction cable 20 such as to move the derailleur and therefore the transmission chain at the adjacent gear wheel of the sprocket set, or of the crankset, respectively. Advantageously, such a release movement is in the direction of a gear wheel of smaller diameter, known as downward gearshifting. In other types of gearshifts, however, the release movement can determine gearshifting towards a gear wheel of greater diameter, known as upward gearshifting.

To carry out gearshifting in the opposite direction, the lever 9 is pushed by the cyclist in the same direction S illustrated in FIG. 6, but pushed a greater distance. The initial operation of the indexing mechanism 12 is the same as that described above with reference to FIGS. 5-7. In other words, in the initial rotation step of the lever 9, there is the engagement of the first ratchet 50 in the space 52a between the first teeth 51, in abutting relationship on the active side of the tooth 51a, the disengagement of the second ratchet 53 from the space 57a between the second teeth 56, and the small rotation of the gear wheel 45 in the direction of unwinding U.

Figure 7:
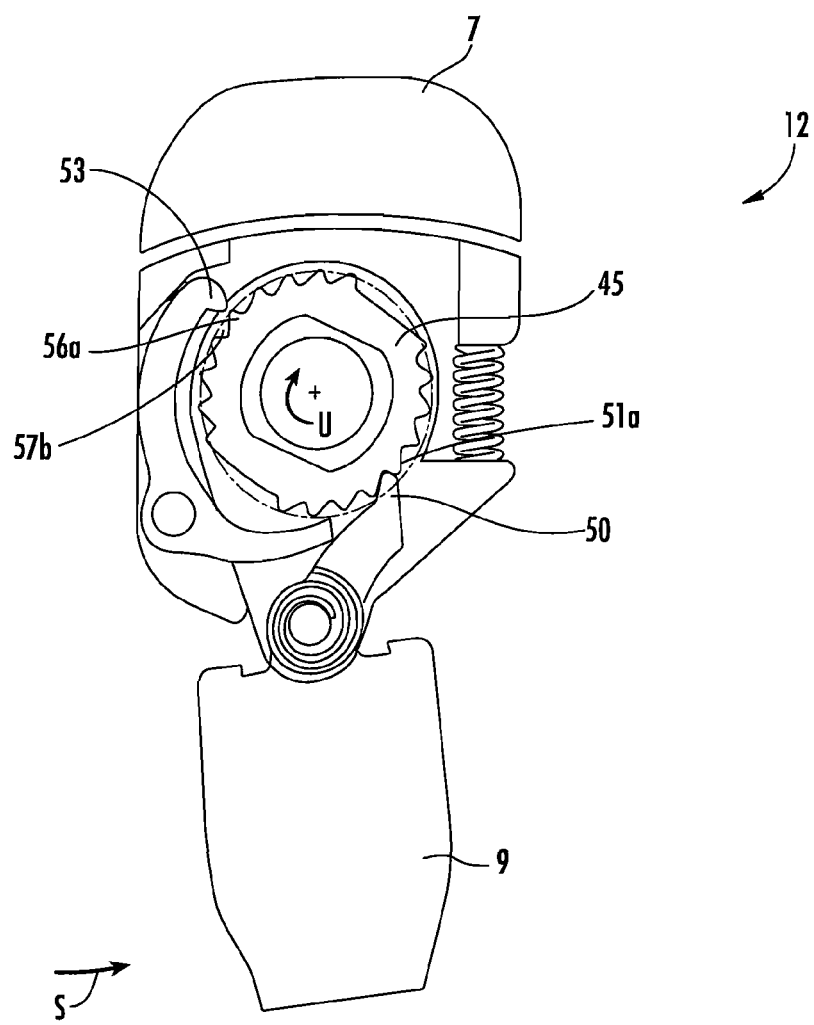
Figure 11:
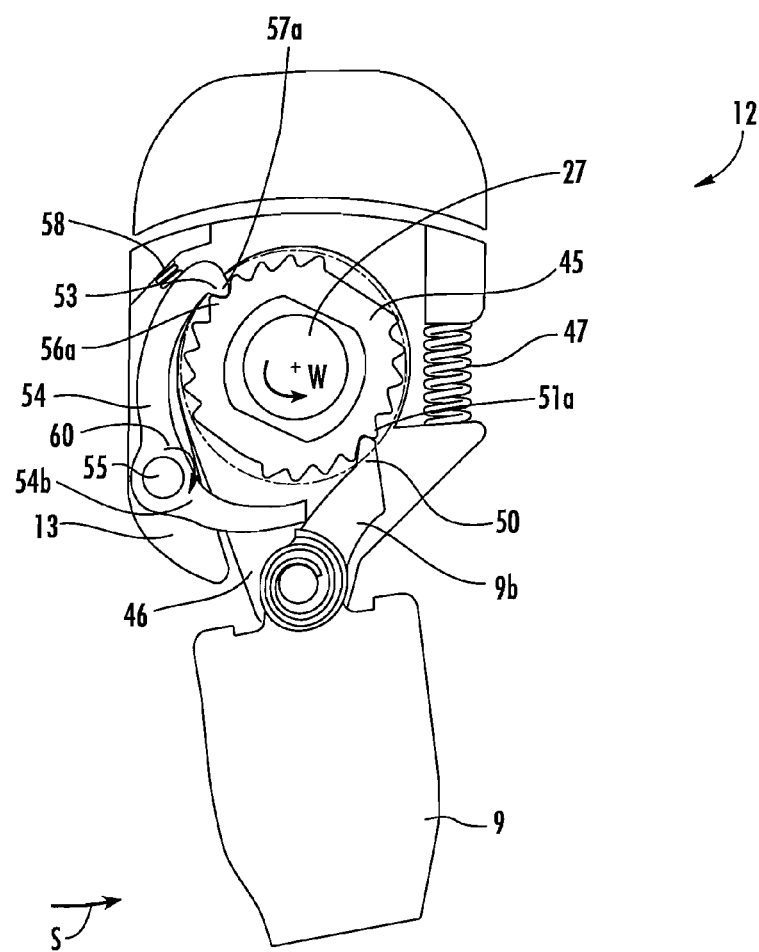

With reference to FIG. 11, as the push on the lever 9 continues in the direction S beyond the limit position represented in FIG. 7, the first ratchet 50 acts by pushing on the active side of the tooth 51a determining the rotation of the gear wheel 45 and therefore of the cable-winding bush in the direction of winding W of the cable, opposite the direction of unwinding U. More specifically, the lever 9 now rotates as a unit with the connecting rod 46 about the main shaft 27, against the action of the compression spring 47. Indeed, in FIG. 11 it can be seen that there is a gap 51 between the left side of the connecting rod 46 and the support plate 13.

At the same time, the pushing action by the driven arm 9b of the lever 9 on the driving arm 54b of the rocker arm 54 also ceases. The rocker arm 54 is therefore biased, by the action of the spring 58, in the direction 60 of rotation about its pivot 55. The second ratchet 53, which as a consequence of the rotation of the gear wheel 45 in the direction of winding W has once again passed over the crest of the tooth 56a, once again engages in the space 57a in which it was initially engaged (FIG. 5).

Figure 12:
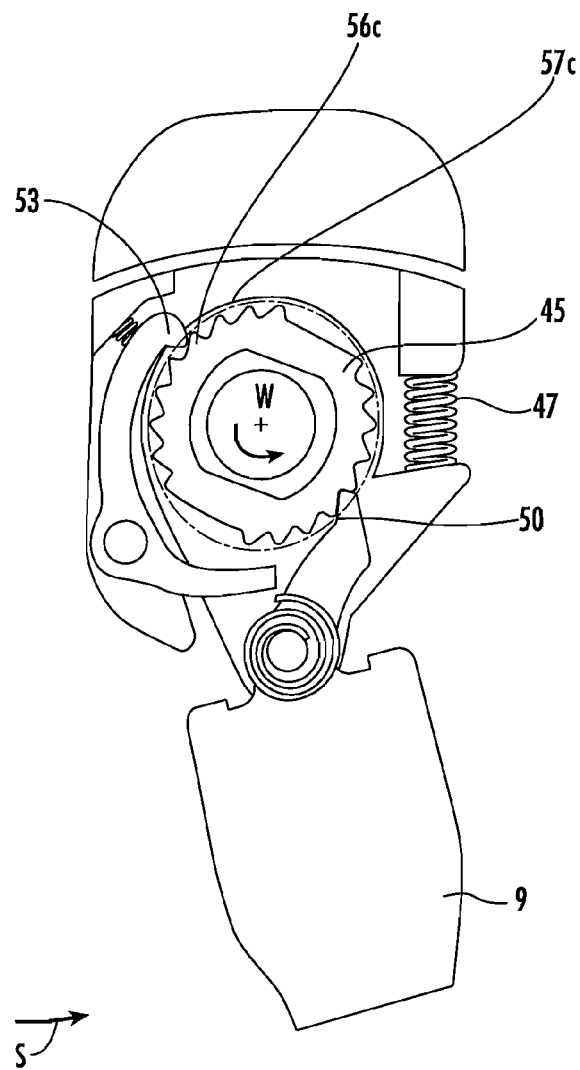
Figure 13:
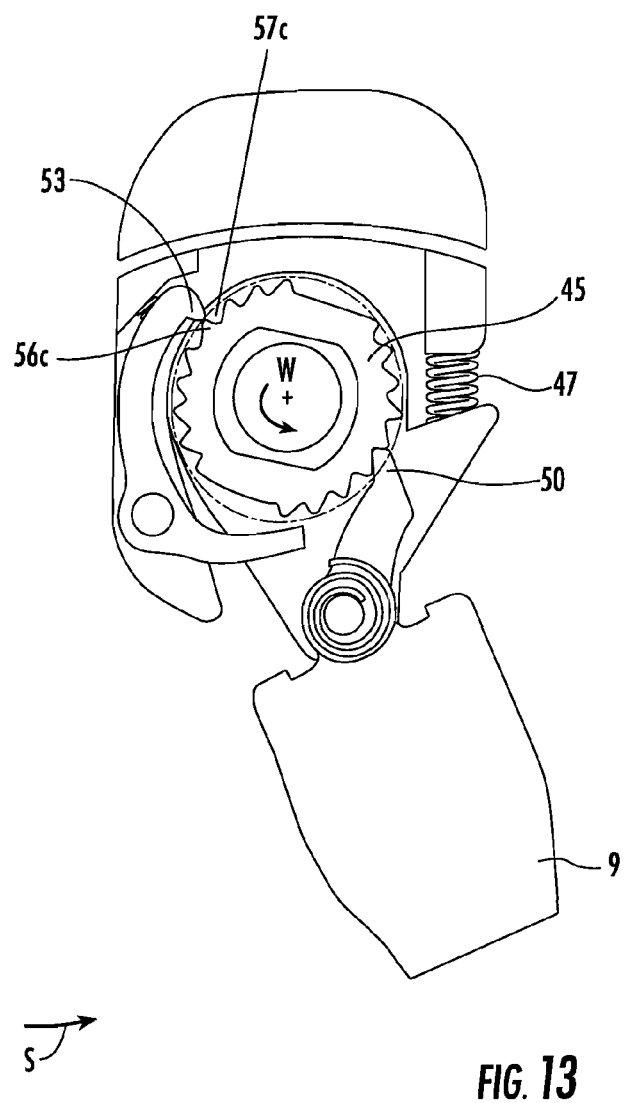
Figure 14:
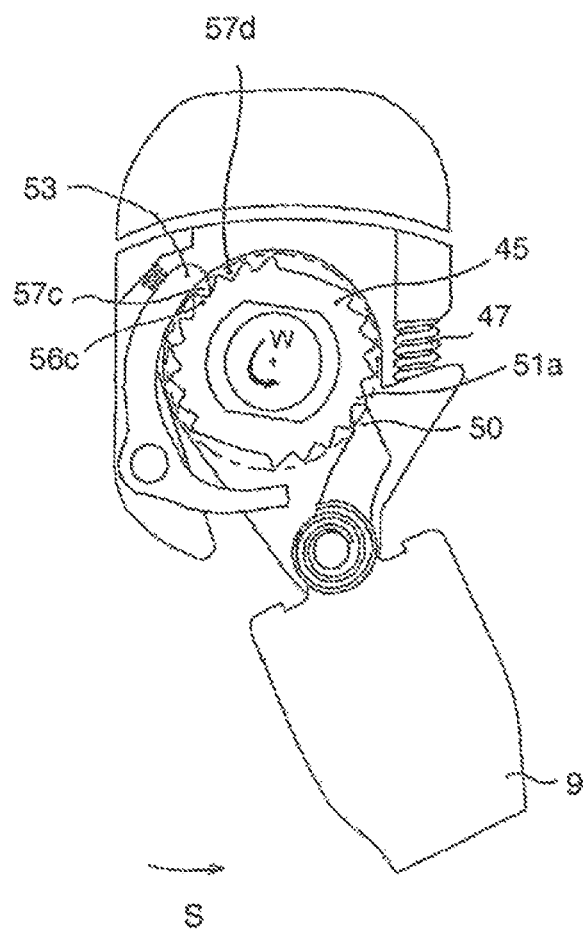

As shown in FIG. 12, the push in direction S on the lever 9 and the consequent rotation in the direction of winding W of the gear wheel 45 through the first ratchet 50 continues, the second ratchet 53 slides on the inactive side of the tooth indicated with 56c, the next tooth in the direction of winding W. It passes over its crest, as illustrated in FIG. 13; and it engages in the space indicated with 57c, the next one in the direction of winding W, as illustrated in FIG. 14.

Figure 15:
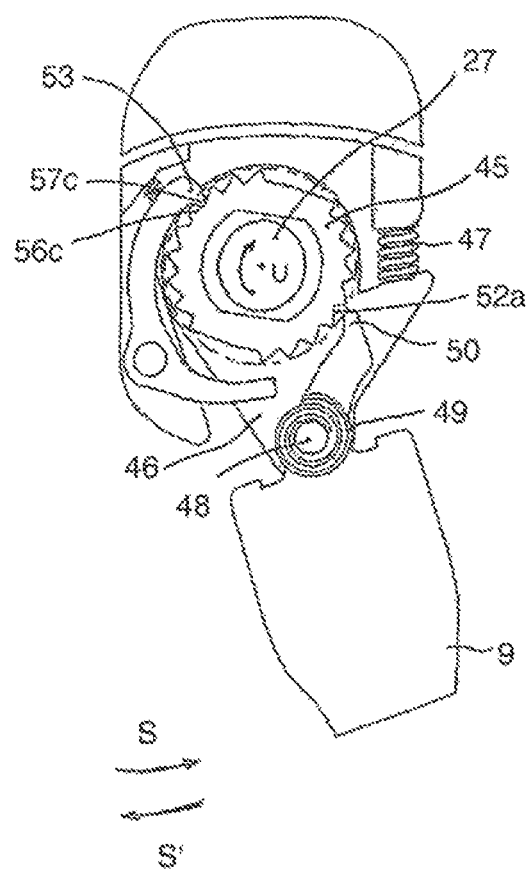

When the lever 9 is released, it is pulled back by the spiral spring 49 in the direction S' indicated in FIG. 15, opposite the direction S, and determines the disengagement of the first ratchet 50 from the space 52a, as shown in the non-static condition of FIG. 15. The second ratchet 53, in an abutting relationship on the active side of the tooth 56c, counteracts the tendency of the gear wheel 45 (and of the cable-winding bush 19), to rotate in the direction of unwinding U, determined by the tension of the traction cable and/or by the spring at the derailleur. The gear wheel 45 and the cable-winding bush 19 are therefore kept stationary by the engagement of the second ratchet 53 in the space 57c.

It should be noted that when releasing the lever 9 from the position of comparatively high rotation, its motion can be a composite motion of simultaneous rotation about the main shaft 27 and rotation with respect to the connecting rod 46, about the pivot 48.

Figure 16:
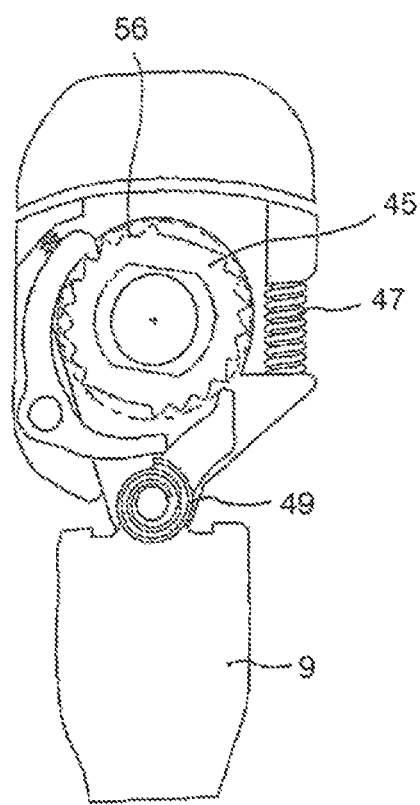

The connecting rod 46 and the lever 9 finally return into the respective rest positions, as illustrated in FIG. 16, under the action of the springs 47 and 49, respectively.

As a consequence of the described push with an angular excursion of comparatively high extent on the lever 9, the gear wheel 45 and therefore the cable-winding bush 19 carry out an angular rotation in the direction of winding W of the traction cable 20, of angular extent corresponding to the pitch between the second teeth 56. Such a rotation corresponds to the winding of a length of the traction cable 20 such as to move the derailleur and therefore the transmission chain at the adjacent gear wheel of the sprocket set, or of the crankset respectively. Advantageously, such a winding movement is in the direction of a gear wheel of greater diameter, or upward gearshifting. In other types of gearshifts, however, the winding movement can determine gearshifting towards a gear wheel of smaller diameter, or downward gearshifting.

It should also be noted that by pushing the lever 9 beyond the position illustrated in FIG. 14, it is advantageously possible to carry out multiple gearshifting in the direction of winding W of the cable again through the pushing of the first ratchet 50 on the active side of the tooth 51a, since the second ratchet 53 will slide on the inactive side of the next tooth, engaging in the next but one space 57d in the direction of winding W and so on.

It should also be noted that all of the aforementioned gearshifting operations commanded by a movement of the lever 9 in direction S can take place whatever the position of the lever 9 and of the intermediate body 11 with respect to the pivot 14, i.e. they can also take place during braking.

Figure 17:
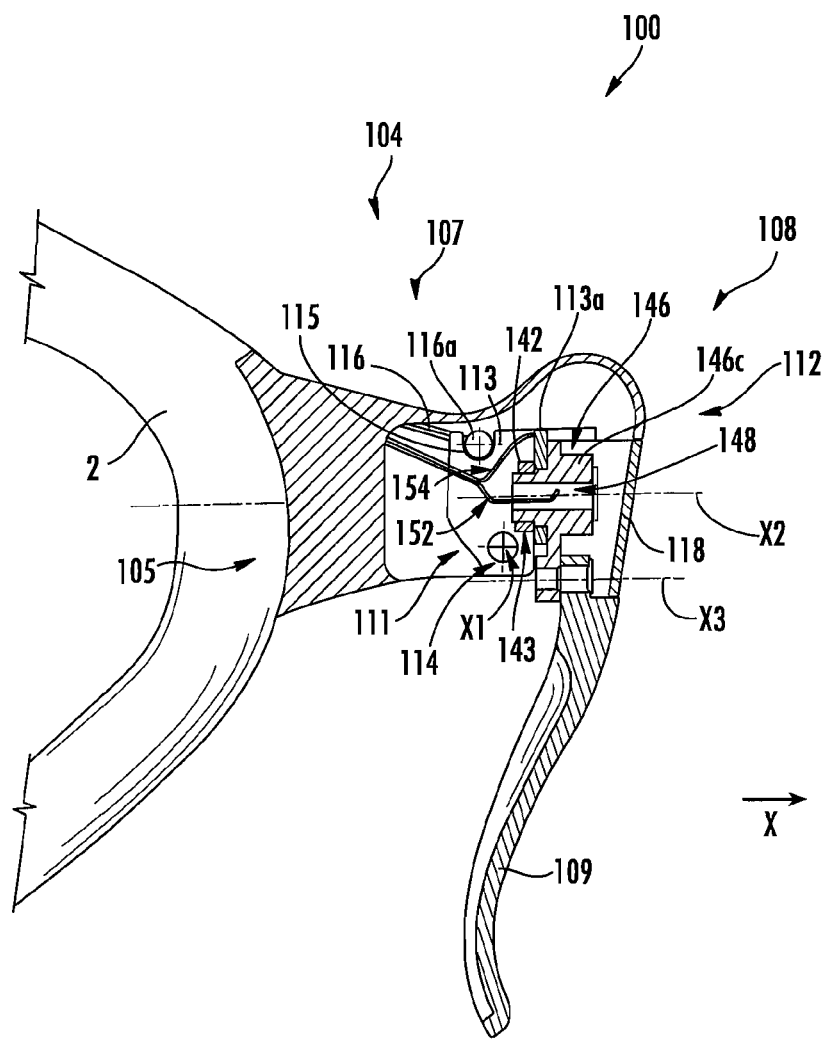
FIG. 17 is a side section view along a vertical section plane of the control device according to the second aspect of the device depicted in FIG. 1, in a first non-operative position.

With reference now to FIG. 17 and thereafter, a control device 100 is shown, which differs from the control device 1 of the mechanical type, described with reference to FIGS. 1 to 16, in that the control device 100 is suitable for being used in a bicycle equipped with a servo-assisted gearshifting system, of the electric/electronic or hydraulic type.

The control device 100 does not therefore act in tension or in release on a derailleur control cable, but through the actuation of the command lever 109 the control device 100 supplies electrical signals in output that are suitably processed by an electronic unit of the system, which then commands the derailleurs through electric actuators.

The movements carried out on the command lever 109 of the command device described here coincide with the movements described for the mechanical control device 1.

Figure 18:
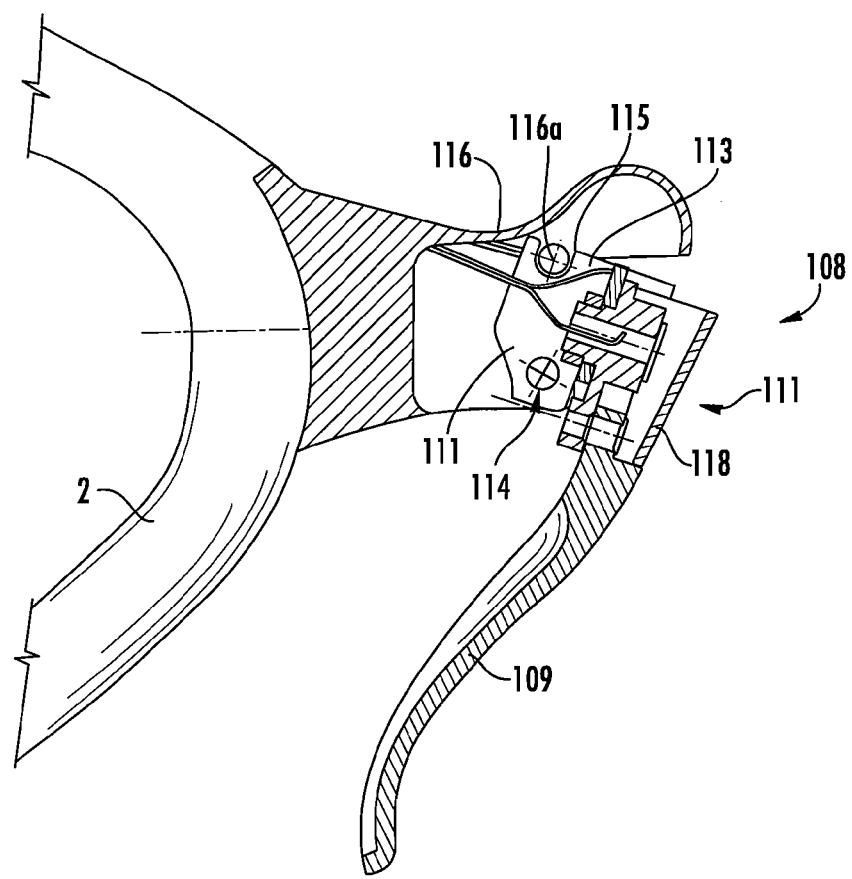
FIG. 18 is a side section view along a vertical section plane of the control device of FIGS. 1 and 17, in a second operative braking position.

In particular, by pulling the lever 109 towards the handlebars, as shown in the FIGS. 17 and 18, the brake control cable 116 is actuated.

Figure 19:
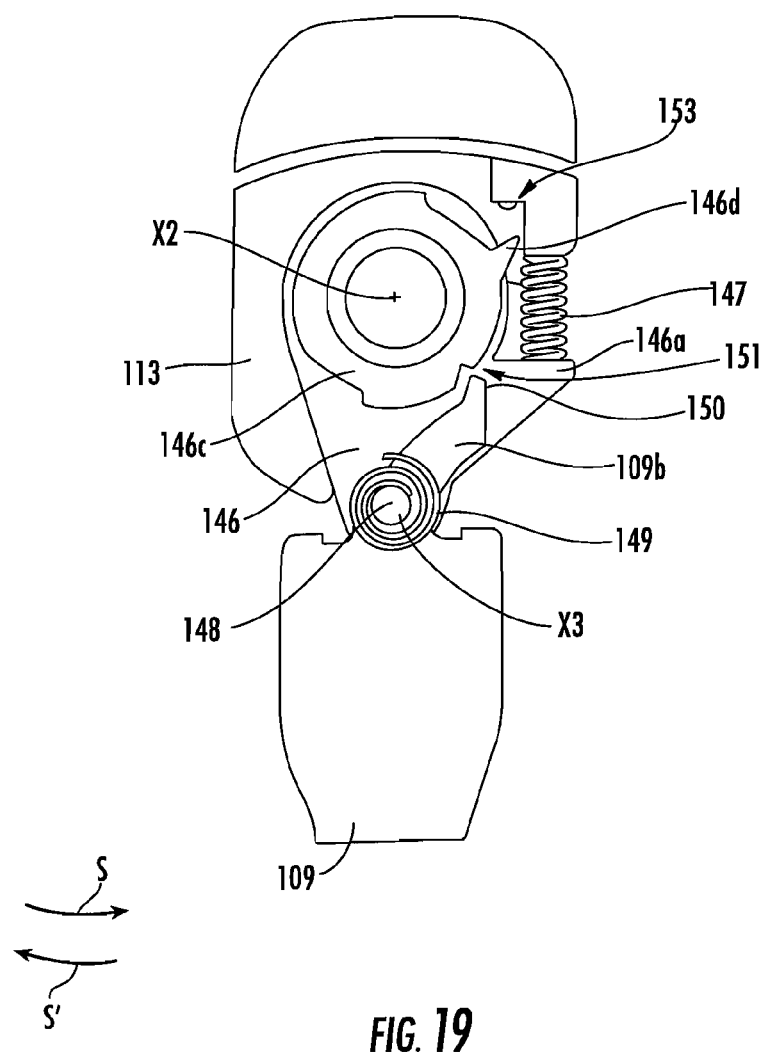
FIGS. 19, 20 and 21 show the control device of FIGS. 1 and 17 in several; operative steps during gearshifting.

When a first movement is carried out with an angular excursion of comparatively low extent on the lever 109 in direction S, shown in FIG. 19, downward gearshifting takes place and with a movement with an angular excursion of comparatively high extent on the lever 109, again in the same direction S, upward gearshifting takes place.

The two functions could be inverted, making a first movement with an angular excursion of comparatively low extent on the lever 109 in direction S correspond to upward gearshifting, and a movement with an angular excursion of comparatively high extent on the lever 109, again in the same direction S, correspond to downward gearshifting.

Referring again to FIGS. 17 and 18, the control device 100 comprises a support body 104 with a side 105 for connection to the handlebars 2 and a portion 107, projecting from the side 105, that can be gripped by the cyclist during travel.

A control group 108 comprising an actuator group 112 and a lever 109, cooperating with the actuator group 112, is mounted on the support body 104. The support body 104 also comprises an intermediate body 111 hinged to the support body 104 in a pivot 114 arranged along a first rotational axis X1, substantially horizontal and perpendicular to the direction of movement X of the bicycle.

The lever 109, which is able to rotate about a second axis X2, and the actuator group 112 are mounted on the intermediate body 111. The intermediate body 111 is formed from a plate 113 hinged to the support body 104 in the aforementioned pivot 114. On the plate 113 an open cylindrical seat 115 is formed for the attachment of a widened head 116a of a brake cable 116.

When the cyclist acts to brake by pulling the lever 109 towards the handlebars 2, the intermediate body 111 rotates about the pivot 114, as can be seen in FIG. 18, taking the control group 108 into rotation and pulling the widened head 116a of the brake cable 116 to carry out braking.

The control group 108 comprises, as stated above, the lever 109, the actuator group 112 and the intermediate body 111, in turn formed from the plate 113. A cover 118 is associated at the front with the lever 109 to cover the actuator group 112.

Figure 20:
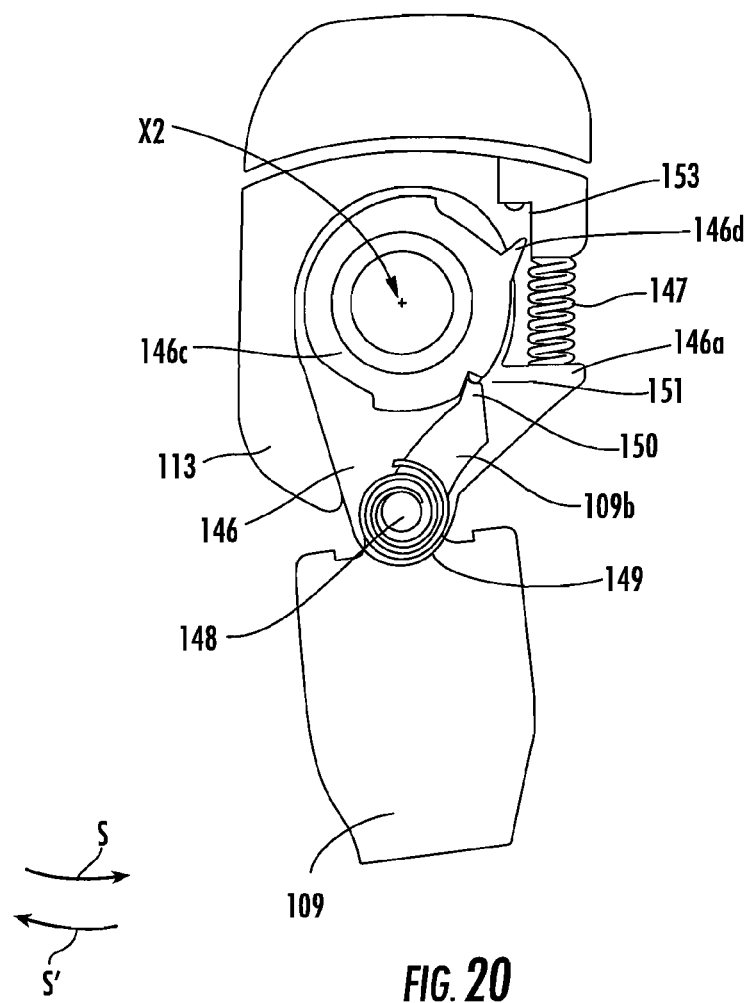
Figure 21:
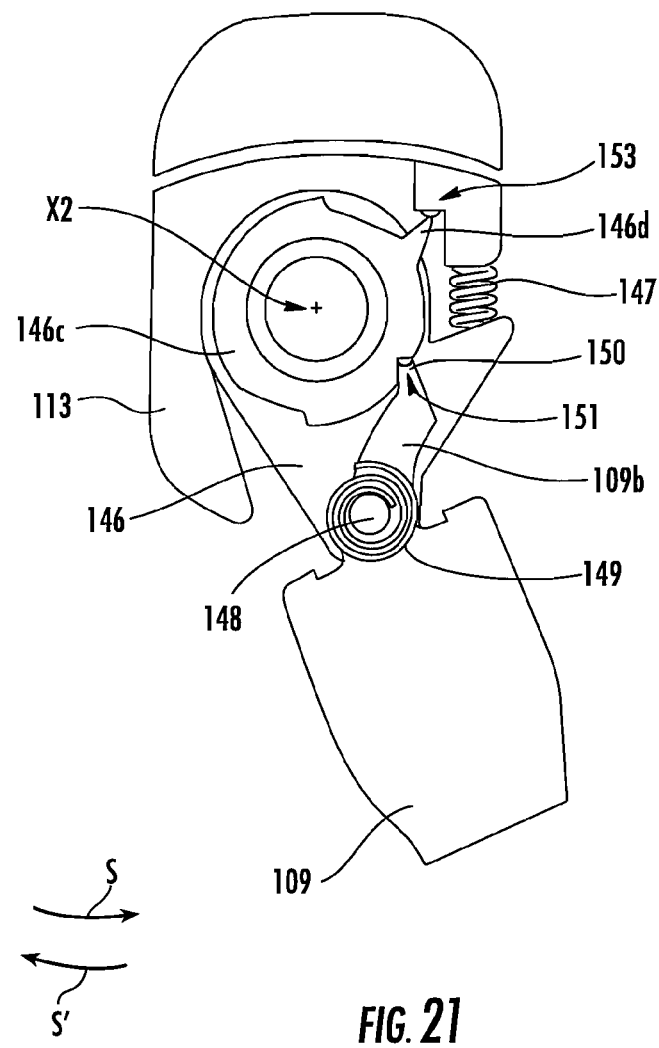

With reference to FIGS. 19-21, the actuator group 112 comprises a connecting rod 146 mounted so that it can rotate about the second rotational axis X2 and provided with a first shank 142 (FIG. 17), carried by the support plate 113 in a hole 113a so that it can rotate. A locknut 143 (FIG. 17), is screwed on the outside of the shank 142 to avoid the connecting rod 146 slipping away from the support plate 113. The connecting rod 146 has an inner cylindrical cavity 148.

The connecting rod 146 is forced in direction U against the support plate 113 by return means, for example by a compression spring 147, extending between the support plate 113 and an appendix 146a of the connecting rod 146. The compression coil spring 147 could be replaced by a spiral spring having one end connected in a point of the connecting rod 146 and the other end connected to the support plate 113, in which case the connecting rod 146 could be without the appendix 146a.

The connecting rod 146 is provided with a second shank 146c having on its outer surface a first switch 151 and an actuation tooth 146d, visible in FIGS. 19, 20 and 21. The first switch 151 is electrically connected to a cable 152 (FIG. 17), arranged passing inside the cylindrical cavity 148 and extending towards the handlebars to reach an electronic unit of the bicycle (not shown).

A second switch 153 is associated with the support plate 113. The second switch 153 is electrically connected to a cable 154 that extends towards the handlebars to also reach the electronic unit of the bicycle.

The lever 109, only partially visible in FIGS. 19, 20 and 21, is hinged to the connecting rod 146 through a pivot 148 arranged about an axis X3. Return means, for example in the form of a spiral spring 149, bias the lever 109 into a predetermined angular position with respect to the connecting rod 146 (substantially vertical in FIG. 19), counteracting the vibrations caused when riding the bicycle.

An actuation tooth 150 is made at the end of the driven arm 109b of the lever 109 to cooperate with the first switch 151 of the connecting rod 146. In the rest condition of the actuator group 112 shown in FIG. 19, the actuation tooth 150 is in a position not in contact with the switch 151.

When the lever 109 is pushed a short distance by the cyclist in the direction indicated as S, it rotates relative to the connecting rod 146 about the pivot 148. Regarding this, it must be emphasized that the spring 149 is comparatively weak and therefore yields, compressing, to the push of the lever 109, substantially without the connecting rod 146 moving.

The actuation tooth 150 made on the driven arm 109b of the lever 109 is therefore taken into rotation about the pivot 148 until it makes contact with the switch 151 and it is actuated (FIG. 20). At such a moment in time T1, the electronic unit detects the actuation of such a switch 151 through a signal carried through the cable 152. Alternatively, another type of transmission could be provided for such a signal, for example a radio frequency wire-less transmission, therefore eliminating the cable 152.

When the lever 109 is released from the operative condition of FIG. 20, it is pulled back by the spiral spring 149 in the direction S', opposite the direction S, and the lever 109 goes back into the rest position.

As a consequence of the described push with an angular excursion of comparatively low extent on the lever 109, the electronic unit has detected the first signal at the moment in time T1.

To carry out gearshifting in the opposite direction, the lever 109 is pushed by the cyclist in the same direction S, but rotated further. The initial operation of the actuator group 112 is the same as that described above with reference to FIGS. 19 and 20 with the actuation of the switch 151 at the moment in time T1. As the pushing on the lever 109 continues in direction S beyond the limit position represented in FIG. 20, the actuation tooth 150 acts by pushing on the switch 151 and on the connecting rod 146. More specifically, the lever 109 now rotates as a unit with the connecting rod 146 about the second axis X2, against the action of the compression spring 147.

As the pushing in direction S on the lever 109 and the consequent rotation of the connecting rod 146 continues, the actuation tooth 146d is taken into contact with the switch 153 (FIG. 21). At such a moment in time T2 the electronic unit detects the actuation of such a switch 153 through the signal carried through the cable 154. Alternatively, another type of transmission could be provided for such a signal, for example a wire-less radio frequency transmission, therefore eliminating the cable 154.

When the lever 109 is released, it is pulled back by the spiral spring 149 in direction S', opposite the direction S, and determines the disengagement of the actuation tooth 146d from the second switch 153.

The connecting rod 146 and the lever 109 finally go back into the respective rest positions under the action of the springs 147 and 149, respectively, and the actuation tooth 150 also disengages from the first switch 151.

As a consequence of the described push with an angular excursion of comparatively high extent on the lever 109, the electronic unit will have detected the two signals at moments T1 and T2.

Downward and upward gearshifting is achieved by the electronic unit of the system through processing of said two signals detected at moments in time T1 and T2.

A method for managing the two signals coming from 151 and 153 can be the following.

Upon the detection of the actuation of the switch 151 at moment T1, the electronic unit waits for a predetermined moment in time, for example Td=200 ms. If the second signal coming from the switch 153 is not detected within such a delay time Td, the control unit carries out downward gearshifting. If, on the other hand, the second signal coming from the switch 153 is detected within the delay time Td, the control unit carries out upward gearshifting.

To carry out downward or upward gearshifting again, the electronic unit waits for the lever 109 to be released, which can be detected at the moment when the two switches 151 and 153 are no longer actuated. In this way, every angular excursion of the lever 109, small or large, corresponds to single gearshifting (downwards or upwards).

In a different management of the two signals, it can be provided that, if the lever is kept by the cyclist in the position of FIG. 20 or 21 for a sufficiently long time, the logic control unit carries out multiple gearshifting until the lever 109 is released.

It is clear that in the embodiment described here, upward and downward gearshifting could easily be inverted through the different management of the two signals, i.e. to carry out upward gearshifting for a small excursion of the lever 109 (FIG. 20) and downward gearshifting for a larger excursion (FIG. 21).

Figure 22:
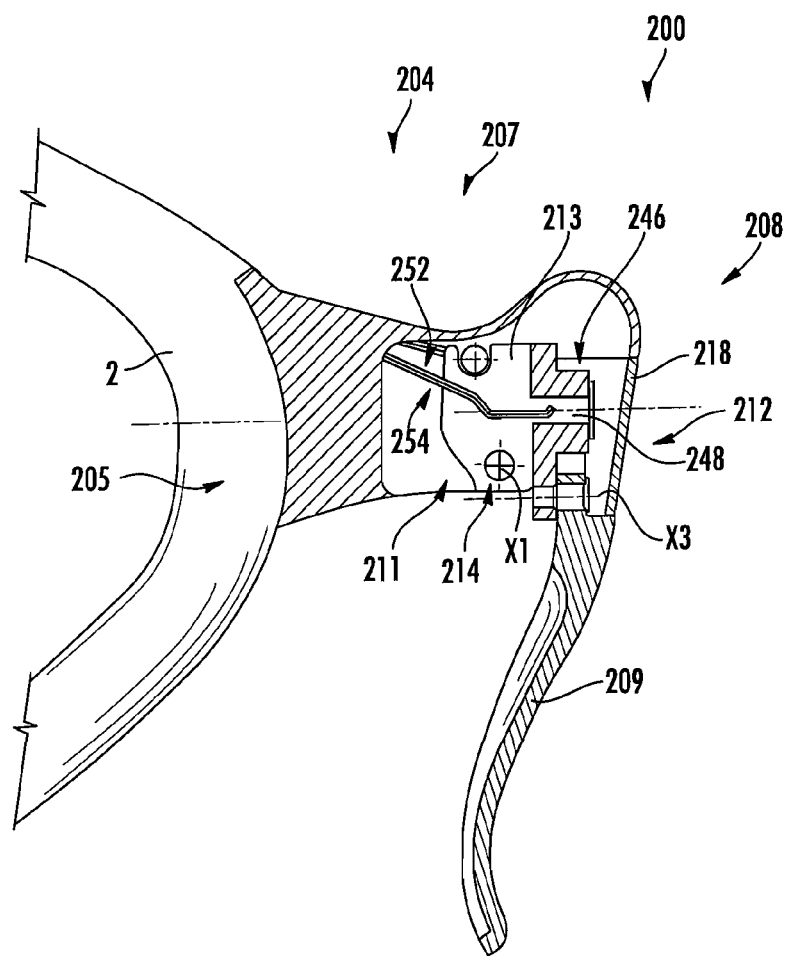
FIG. 22 is a side section view along a vertical section plane of the control device according to the third aspect of the device depicted in FIG. 1, in a first non-operative position.
Figure 23:
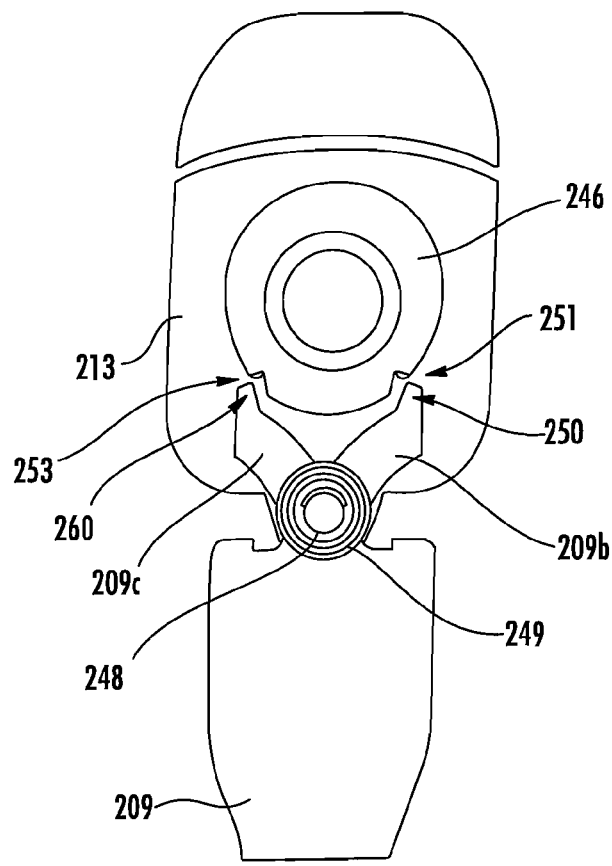
FIG. 23 shows the control device of FIGS. 1 and 22 in an operative step during gearshifting.
Figure 23:
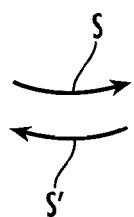

With reference now to FIGS. 22 and 23, a control device 200 is shown, which, like the control device 100, is suitable for being used in a bicycle equipped with a servo-assisted gearshifting system.

The control device 200 comprises a support body 204 with a side 205 for connection to the handlebars 2 and a portion 207, projecting from the side 205, that can be gripped by the cyclist when riding.

A control group 208 comprising an actuator group 212 and a lever 209, cooperating with the actuator group 212, is mounted on the support body 204. The support body 204 also comprises an intermediate body 211 hinged to the support body 204, in a pivot 214 arranged along a first rotational axis X1, substantially horizontal and perpendicular to the direction of movement X of the bicycle.

The lever 209, able to rotate about a second axis X3 is mounted on the intermediate body 211. The intermediate body 211 is formed from a plate 213 hinged to the support body 204 in the aforementioned pivot 214.

The control group 208, described with reference to FIG. 23, comprises, as stated above, the lever 209, the actuator group 212 and the intermediate body 211, in turn formed from the plate 213. A cover 218 is associated at the front with the lever 209 to cover the actuator group 212.

As shown in FIG. 23, the support plate 213 is provided with a shank 246 having on its outer surface a first switch 251 and a second switch 253. The first switch 251 is electrically connected to a cable 252 (FIG. 22), arranged passing inside the cylindrical cavity 248 of the support plate 213 and extends towards the handlebars to reach an electronic unit of the bicycle (not shown). The second switch 253 is electrically connected to a cable 254 (FIG. 22), arranged passing inside the cylindrical cavity 248 and extends towards the handlebars to also reach the electronic unit of the bicycle.

The lever 209, only partially visible in FIG. 23, is hinged to the support plate 213 through a pivot 248 about axis X3. Return means, for example in the form of one or more spiral springs 249, bias the lever 209 into a predetermined angular position with respect to the support body 213 (substantially vertical in FIG. 23), counteracting the vibrations caused in riding the bicycle.

A first actuation tooth 250 is made at the end of a first driven arm 209b of the lever 209 to cooperate with the first switch 251.

A second actuation tooth 260 is made at the end of a second driven arm 209c of the lever 209 to cooperate with the second switch 253.

In the rest condition shown in FIG. 23, the first and second actuation teeth 250 and 260 are in a position not in contact with the switches 251 and 253.

When the lever 209 is pushed by the cyclist in the direction indicated as S, it rotates relative to the support plate 213 about the pivot 248. The first actuation tooth 250 made on the first driven arm 209b of the lever 209 is therefore taken into rotation about the pivot 248 until it makes contact with the first switch 251 and it is actuated.

The electronic unit detects the actuation of such a switch 251 through the signal carried through the cable 252.

When the lever 209 is released, it is pulled back by the spiral springs 249 in direction S', opposite direction S, and the lever 209 goes back into rest position.

When the lever 209 is pushed by the cyclist in the direction indicated with S', it rotates relative to the support plate 213 about the pivot 248. The second actuation tooth 260 made on the second driven arm 209c of the lever 209 is therefore taken into rotation about the pivot 248 until it makes contact with the second switch 253 and it is actuated.

The electronic unit detects the actuation of such a second switch 253 through the signal carried through the cable 254.

When the lever 209 is released, it is pulled back by the spiral springs 249 in direction S, opposite direction S', and the lever 209 goes back into the rest position.

Downward and upward gearshifting is achieved by the electronic unit of the system through processing of said two signals detected by the actuation of the two switches 251 and 253.

What is claimed is:

1. An integrated control device for operating a brake and a derailleur associated with a bicycle, the control device comprising
   a support body fixed to a handlebar of the bicycle,
   a single lever that is connected to the support body and operates both the brake and the derailleur,
   an intermediate body arranged between the support body and the single lever, and,
   a derailleur shifting mechanism including:
      a driven arm that is pivotally connected to the single lever at one end and has a first ratchet at another,
      a rocker arm that slidingly engages the driven arm and has a second ratchet at an end thereof that is biased by a compression spring supported on the intermediate body, and
      a cable-winding bush that is fixed to a toothed gear wheel positioned to engage the first and second ratchets, and is biased in a first rotational direction, and,
   the single lever has a rest position in which the single lever is inactive,
   wherein movement of the single lever from the rest position in a first direction relative to the support body operates only the brake by rotating the intermediate body about a pivot and pulling a head of a brake cable away from the handlebar in a direction parallel to movement of the bicycle, and movement of the single lever from the rest position in a second direction relative to the support body operates only the derailleur, so that in a rest position the second ratchet is engaged with the teeth of the gear wheel and prevents free rotation of the cable-winding bush, movement of the single lever for a first distance in the second direction operates the derailleur in a first shift direction by pivoting the driven arm into contact with the driving arm of the rocker arm such that the rocker arm pivots and forces the second ratchet against the compression spring to disengage from the teeth on the gear wheel and allow the cable-winding bush to rotate in the first rotational direction, and movement of the single lever for a second distance in the second direction operates the derailleur opposite to the first shift direction by engaging the first ratchet with the teeth on the gear wheel in a direction opposite to the first rotational direction and forcing the driven arm out of engagement with the driving arm of the rocker arm such that the second ratchet slides to an adjacent tooth on the gear wheel, whereby the second distance is different from the first distance.

2. A device according to claim 1, wherein the second direction is substantially perpendicular to the first direction.

3. A device according to claim 1, wherein the movement of the derailleur in the first shift direction corresponds to downward gear shifting and the movement of the derailleur in the second shift direction corresponds to upward gear shifting.

4. A device according to claim 1, wherein the movement of the derailleur in the first shift direction corresponds to upward gear shifting and the movement of the derailleur in the second shift direction corresponds to downward gear shifting.

5. A device according to claim 1, wherein the support body is configured to be gripped in a hand.

6. A device according to claim 1, wherein the intermediate body is supported so that it can move in rotation with respect to the support body about a first rotational axis, and said single lever moves in rotation with respect to the intermediate body about a second rotational axis, different from the first.

7. A device according to claim 6, wherein when the single lever is in the rest position, said second rotational axis is substantially perpendicular to said first rotational axis.

8. A device according to claim 7, wherein said first rotational axis is substantially horizontal with respect to a surface that the bicycle is traveling on.

9. A device according to claim 6, wherein the intermediate body comprises a seat for receiving a widened head of a brake control cable.

10. A device according to claim 6, further comprising a connecting rod mounted so that it moves in rotation with respect to the intermediate body about the second rotational axis, the single lever is hinged to the connecting rod and is angularly mobile with respect to the connecting rod about a third rotational axis between the rest position and a deviated position, the third rotational axis being parallel to and offset from the second rotational axis, and the connecting rod is angularly mobile with respect to the intermediate body about the second rotational axis between a rest position and at least one deviated position.

11. A device according to claim 10, further comprising a first elastic member between the connecting rod and the intermediate body to push the connecting rod into its rest position, and a second elastic member between the single lever and the connecting rod to push the single lever into its rest position.

12. A device according to claim 11, wherein the first elastic member exerts a push on the connecting rod that prevails over the second elastic member, so that a push on the single lever first moves the single lever into the deviated position without moving the connecting rod, and subsequently moves the connecting rod.

13. A device according to claim 10, wherein the cable-winding bush is supported so that it rotates on the support body, on which bush the derailleur control cable is wound, the derailleur component that the first end of the intermediate shaft is connected to being arranged on the cable-winding bush, the gear wheel is supported so that the gear wheel can move in rotation on the intermediate body about the second rotational axis between a predetermined number of predetermined angular positions corresponding to the desired positions of the derailleur, a transmission mechanism between the cable-winding bush and the gear wheel, that causes a rotation of the gear wheel to correspond to a rotation of the cable-winding bush.

14. A device according to claim 13, wherein the transmission mechanism comprises a sliding connection that allows movement of said gear wheel with respect to said cable-winding bush.

15. A device according to claim 14, wherein the transmission mechanism allows a rotation of said intermediate body about said first axis.

16. A device according to claim 15, wherein said sliding connection comprises at least one slot that slidably receives a projecting element associated with said cable-winding bush or said gear wheel.

17. A device according to claim 15, wherein said transmission mechanism comprises said intermediate shaft, a first Hooke's joint and a second Hooke's joint, said first Hooke's joint connecting said intermediate shaft to said gear wheel and said second Hooke's joint connecting said intermediate shaft to said cable-winding bush.

18. A device according to claim 13, wherein:
the gear wheel comprises a first sector and a second sector that each includes a plurality of teeth and a number of spaces formed between adjacent ones of the plurality of teeth, the number of spaces being at least equal to the predetermined number of angular positions;
the driven arm faces towards the first sector, provided with the first ratchet, which has a shape compatible with the shape of a space of the first sector;
the rocker arm is hinged to the intermediate body according to a fourth rotational axis and the second ratchet has a shape compatible with the shape of a space of the second sector, and
the compression spring pushes the rocker arm with its second arm towards the second sector;
wherein:
the driven arm of the single lever pushes on the first arm of the rocker arm against the push of the compression spring when the single lever is moved from its rest position towards its deviated position.

19. A device according to claim 18, wherein the spaces of the first and second sectors are each defined by an active side and by an inactive side, the active side facing in a first direction of rotation of the gear wheel which corresponds to a direction of rotation of the cable-winding bush during winding of the derailleur control cable.

20. A device according to claim 19, wherein when the lever and the connecting rod are in their rest positions, the first ratchet is not engaged with any space of the first sector whereas the second ratchet is engaged in one of the spaces of the second sector such that the second ratchet abuts the active side of the space, so as to prevent rotation of the gear wheel in a second direction of rotation opposite the first direction of rotation.

21. A device according to claim 20, wherein, when the lever is taken from its rest position into its deviated position without the connecting rod moving from its rest position, the first ratchet is taken into partial engagement in one of the spaces of the first sector, distanced from the active side, whereas the second ratchet is taken out of engagement with the space of the second sector, so that the gear wheel can rotate in the second direction of rotation due to the tension of the derailleur control cable, which allows the first ratchet to move against the active side of the space in which it is engaged while the second ratchet moves to a position in front of an adjacent space.

22. A device according to claim 21, wherein, when the lever is taken back from its deviated position to its rest position, without the connecting rod moving from its rest position, the second ratchet goes into engagement with the space that it was opposite to, while the first ratchet is taken out of engagement with the space in which it was engaged.

23. A device according to claim 21, wherein, when the connecting rod is taken from its rest position to its deviated position, with the lever remaining in its deviated position with respect to the connecting rod, the first ratchet remains engaged in the space and pushes the active side of the space, making the gear wheel rotate in the first direction, whereas the second ratchet is pressed by the compression spring against the gear wheel and slides on the inactive side of the spaces without opposing the rotation of the gear wheel.

24. A device according to claim 23, wherein, when the connecting rod and the lever are returned to their rest positions, the first ratchet is taken out of engagement with the gear wheel whereas the second ratchet remains engaged in one of the spaces, preventing the rotation of the gear wheel in the second direction.

25. A control device for a bicycle comprising:
a single lever that is connected to a support body and operates both a brake and a derailleur, wherein the single lever has a rest position,
an intermediate body arranged between the support body and the single lever, and,
a derailleur shifting mechanism including:
a driven arm that is pivotally connected to the single lever at one end and has a first ratchet at another,
a rocker arm that slidingly engages the driven arm and has a second ratchet at an end thereof that is biased by a compression spring supported on the intermediate body, and
a cable-winding bush that is fixed to a toothed gear wheel positioned to engage the first and second ratchets, and is biased in a first rotational direction,
movement of the single lever from the rest position in a first direction relative to the support body operates only the brake by rotating the intermediate body about a pivot and pulling a head of a brake cable away from the handlebar in a direction parallel to movement of the bicycle,
movement of the single lever from the rest position in a second direction relative to the support body operates only the derailleur, so that in a rest position the second ratchet is engaged with the teeth of the gear wheel and prevents free rotation of the cable-winding bush,
movement of the single lever by a first distance in the second direction operates the derailleur in a first derailleur direction by pivoting the driven arm into contact with the driving arm of the rocker arm such that the rocker arm pivots and forces the second ratchet against the compression spring to disengage from the teeth on the gear wheel and allow the cable-winding bush to rotate in the first rotational direction, and
movement of the single lever by a second distance in the second direction operates the derailleur in a second derailleur direction by engaging the first ratchet with the teeth on the gear wheel in a direction opposite to the first rotational direction and forcing the driven arm out of engagement with the driving arm of the rocker arm such that the second ratchet slides to an adjacent tooth on the gear wheel, whereby the second distance is different than the first distance.

26. A device according to claim 25, wherein the cable-winding bush is supported on the support body and a derailleur control cable is wound on the cable-winding bush,
the gear wheel moves in rotation on the intermediate body between a predetermined number of predetermined angular positions corresponding to the desired positions of the derailleur, and
a transmission mechanism between the cable-winding bush and the gear wheel, that rotates the gear wheel to correspond to a rotation of the cable-winding bush.

27. A device according to claim 26, wherein the transmission mechanism comprises a sliding connection that allows substantially linear movement of said gear wheel with respect to said cable-winding bush.

28. A control device for controlling a bicycle derailleur, comprising:
a support body fixed to a handlebar of a bicycle,
a lever that is connected to the support body and operates both a brake and a derailleur,
an intermediate body arranged between the support body and the lever, and,
a derailleur shifting mechanism including:
a driven arm that is pivotally connected to the lever at one end and has a first ratchet at another,
a rocker arm that slidingly engages the driven arm and has a second ratchet at an end thereof that is biased by a compression spring supported on the intermediate body, and
a cable-winding bush that is fixed to a toothed gear wheel positioned to engage the first and second ratchets, and is biased in a first rotational direction, and
an intermediate shaft having a first end rotatably connected to a main shaft associated with the lever and a second end slidably connected to a derailleur component;
wherein movement of the lever relative to the support body in a first direction operates only the brake by rotating the intermediate body about a pivot and pulling a head of a brake cable away from the handlebar in a direction parallel to movement of the bicycle,
movement of the lever relative to the support body in a second direction operates the derailleur so that in a rest position the second ratchet is engaged with the teeth of the gear wheel and prevents free rotation of the cable-winding bush;
wherein the derailleur moves in first and second derailleur directions, and movement in each of these derailleur directions is controlled by movement of the lever in the second direction;

wherein movement of the lever by a predetermined distance in the second direction moves the derailleur in the first derailleur direction by pivoting the driven arm into contact with the driving arm of the rocker arm such that the rocker arm pivots and forces the second ratchet against the compression spring to disengage from the teeth on the gear wheel and allow the cable-winding bush to rotate in the first rotational direction, and movement of the lever by a greater predetermined distance in the second direction moves the derailleur in the second derailleur direction by engaging the first ratchet with the teeth on the gear wheel in a direction opposite to the first rotational direction and forcing the driven arm out of engagement with the driving arm of the rocker arm such that the second ratchet slides to an adjacent tooth on the gear wheel, wherein the second derailleur direction is substantially opposite to the first derailleur direction.

29. A control device for controlling a bicycle derailleur, comprising:

a support body fixed to a handlebar of a bicycle, a lever that is connected to the support body and operates both a brake and a gearshift mechanism, an intermediate body arranged between the support body and the single lever, and, a derailleur shifting mechanism including:

a driven arm that is pivotally connected to the lever at one end and has a first ratchet at another, a rocker arm that slidingly engages the driven arm and has a second ratchet at an end thereof that is biased by a compression spring supported on the intermediate body, and a cable-winding bush that is fixed to a toothed gear wheel positioned to engage the first and second ratchets, and is biased in a first rotational direction, and an intermediate shaft having a first end rotatably connected to a main shaft associated with the lever and a second end slidably connected to a portion of the gearshift mechanism;

moving the lever relative to the support body in a first direction operates the brake by rotating the intermediate body about a pivot and pulling a head of a brake cable away from the handlebar in a direction parallel to movement of the bicycle, and moving the lever relative to the support body in a second direction for a predetermined distance operates the gearshift mechanism, so that in a rest position the second ratchet is engaged with the teeth of the gear wheel and prevents free rotation of the cable-winding bush;

wherein the gearshift mechanism carries out an upwards gearshift or a downwards gearshift, in response to the predetermined distance the lever moves in the second direction, and movement of the lever for a first distance in the second direction operates the derailleur in a first shift direction by pivoting the driven arm into contact with the driving arm of the rocker arm such that the rocker arm pivots and forces the second ratchet against the compression spring to disengage from the teeth on the gear wheel and allow the cable-winding bush to rotate in the first rotational direction, and movement of the lever for a second distance in the second direction operates the derailleur opposite to the first shift direction by engaging the first ratchet with the teeth on the gear wheel in a direction opposite to the first rotational direction and forcing the driven arm out of engagement with the driving arm of the rocker arm such that the second ratchet slides to an adjacent tooth on the gear wheel.

30. An integrated control device for operating a brake and a derailleur associated with a bicycle, the control device comprising a support body fixed to a handlebar of the bicycle, a single lever that is connected to the support body and operates both the brake and the derailleur, and has a rest position in which the single lever is inactive, an intermediate body arranged between the support body and the single lever, and, a derailleur shifting mechanism including:

a driven arm that is pivotally connected to the single lever at one end and has a first ratchet at another, a rocker arm that slidingly engages the driven arm and has a second ratchet at an end thereof that is biased by a compression spring supported on the intermediate body, and a cable-winding bush that is fixed to a toothed gear wheel positioned to engage the first and second ratchets, and is biased in a first rotational direction, and movement of the single lever from the rest position in a first direction relative to the support body operates only the brake by rotating the intermediate body about a pivot and pulling a head of a brake cable away from the handlebar in a direction parallel to movement of the bicycle, and movement of the single lever from the rest position for a predetermined distance in a second direction relative to the support body operates only the derailleur, so that in a rest position the second ratchet is engaged with the teeth of the gear wheel and prevents free rotation of the cable-winding bush;

movement of the single lever in the second direction for a first predetermined distance in the second direction operates the derailleur in a first shift direction by pivoting the driven arm into contact with the driving arm of the rocker arm such that the rocker arm pivots and forces the second ratchet against the compression spring to disengage from the teeth on the gear wheel and allow the cable-winding bush to rotate in the first rotational direction, and movement of the single lever in the second direction for a second predetermined distance operates the derailleur in a second shift direction that is different from the first shift direction, by engaging the first ratchet with the teeth on the gear wheel in a direction opposite to the first rotational direction and forcing the driven arm out of engagement with the driving arm of the rocker arm such that the second ratchet slides to an adjacent tooth on the gear wheel.

* * * * *